US012724315B2

(12) United States Patent
Harris et al.

(10) Patent No.: US 12,724,315 B2
(45) Date of Patent: Sep. 1, 2026

(54) ELECTRO-OPTIC DISPLAYS WITH EDGE SEAL COMPONENTS AND METHODS OF MAKING THE SAME

(71) Applicant: E INK CORPORATION, Billerica, MA (US)

(72) Inventors: George G. Harris, Woburn, MA (US); Richard J. Paolini, Jr., Framingham, MA (US); David Victor Marcolin, Coquitlam (CA); Xianhe Wei, Lynn, MA (US); Shyamala Subramanian, Arlington, MA (US)

(73) Assignee: E INK CORPORATION, Billerica, MA (US)

( * ) Notice: Subject to any disclaimer, the term of this patent is extended or adjusted under 35 U.S.C. 154(b) by 646 days.

(21) Appl. No.: 18/173,522

(22) Filed: Feb. 23, 2023

(65) Prior Publication Data

US 2024/0288742 A1 Aug. 29, 2024

Related U.S. Application Data

(60) Provisional application No. 63/313,974, filed on Feb. 25, 2022.

(51) Int. Cl.
*G02F 1/1679* (2019.01)
*G02F 1/167* (2019.01)
(Continued)

(52) U.S. Cl.
CPC .......... *G02F 1/1679* (2019.01); *G02F 1/1676* (2019.01); *G02F 1/167* (2013.01); *G02F 1/16755* (2019.01); *G02F 2202/28* (2013.01)

(58) Field of Classification Search
CPC ............... G02F 1/16757; G02F 1/1675; G02F 1/16756; G02F 1/1677; G02F 1/1676;
(Continued)

(56) References Cited

U.S. PATENT DOCUMENTS 4,418,346 A 11/1983 Batchelder
4,640,583 A 2/1987 Hoshikawa et al.
(Continued)

FOREIGN PATENT DOCUMENTS

CN 111489647 A * 8/2020 ............. G09F 9/301
EP 1462847 A1 9/2004
(Continued)

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).
(Continued)

*Primary Examiner* — Ricky L Mack
*Assistant Examiner* — Elizabeth M Hall
(74) *Attorney, Agent, or Firm* — Quarles & Brady, LLP

(57) ABSTRACT

An electro-optic display includes a backplane with at least one electrode, a layer of an electro-optic material disposed adjacent to the backplane, and a light-transmissive electrically-conductive layer disposed on the opposite side of the layer of electro-optic material from the backplane. The electro-optic display also includes a rod member disposed laterally adjacent to the backplane, the electro-optic material, and the light-transmissive electrically-conductive layer. A first barrier layer is disposed adjacent to the light-transmissive electrically-conductive layer and a first side of the rod member, and a second barrier is layer disposed on the backplane and a second side of the rod member. The second side is the opposite side of the rod member from the first side. A flexible barrier tape extends from an edge portion of the first barrier layer, around the rod member, to an edge portion of the second barrier layer.

19 Claims, 12 Drawing Sheets

(51) Int. Cl.
*G02F 1/16755* (2019.01)
*G02F 1/1676* (2019.01)

(58) Field of Classification Search
CPC ............. G02F 1/16761; G02F 1/16762; G02F 1/16766; G02F 1/16753; G02F 1/16755; G02F 1/1679; G02F 1/1681; G02F 1/167; G02F 1/161; G02F 2001/1678; G02F 1/1685; G02F 1/165; G09F 9/30
USPC .......................................... 359/296; 345/107
See application file for complete search history.

(56) References Cited

U.S. PATENT DOCUMENTS 5,760,761 A 6/1998 Sheridon
5,777,782 A 7/1998 Sheridon
5,808,783 A 9/1998 Crowley
5,872,552 A 2/1999 Gordon, II et al.
5,930,026 A 7/1999 Jacobson et al.
5,961,804 A 10/1999 Jacobson et al.
6,017,584 A 1/2000 Albert et al.
6,054,071 A 4/2000 Mikkelsen, Jr.
6,055,091 A 4/2000 Sheridon
6,067,185 A 5/2000 Albert et al.
6,097,531 A 8/2000 Sheridon
6,118,426 A 9/2000 Albert et al.
6,120,588 A 9/2000 Jacobson
6,120,839 A 9/2000 Comiskey et al.
6,124,851 A 9/2000 Jacobson
6,128,124 A 10/2000 Silverman
6,130,774 A 10/2000 Albert et al.
6,137,467 A 10/2000 Sheridon et al.
6,144,361 A 11/2000 Gordon, II et al.
6,147,791 A 11/2000 Sheridon
6,177,921 B1 1/2001 Comiskey et al.
6,184,856 B1 2/2001 Gordon, II et al.
6,225,971 B1 5/2001 Gordon, II et al.
6,232,950 B1 5/2001 Albert et al.
6,252,564 B1 6/2001 Albert et al.
6,262,706 B1 7/2001 Albert et al.
6,262,833 B1 7/2001 Loxley et al.
6,271,823 B1 8/2001 Gordon, II et al.
6,300,932 B1 10/2001 Albert
6,301,038 B1 10/2001 Fitzmaurice et al.
6,312,304 B1 11/2001 Duthaler et al.
6,312,971 B1 11/2001 Amundson et al.
6,323,989 B1 11/2001 Jacobson et al.
6,327,072 B1 12/2001 Comiskey et al.
6,376,828 B1 4/2002 Comiskey
6,377,387 B1 4/2002 Duthaler et al.
6,392,786 B1 5/2002 Albert
6,413,790 B1 7/2002 Duthaler et al.
6,445,489 B1 9/2002 Jacobson et al.
6,459,418 B1 10/2002 Comiskey et al.
6,473,072 B1 10/2002 Comiskey et al.
6,480,182 B2 11/2002 Turner et al.
6,498,114 B1 12/2002 Amundson et al.
6,504,524 B1 1/2003 Gates et al.
6,506,438 B2 1/2003 Duthaler et al.
6,512,354 B2 1/2003 Jacobson et al.
6,515,649 B1 2/2003 Albert et al.
6,518,949 B2 2/2003 Drzaic
6,531,997 B1 3/2003 Gates et al.
6,538,801 B2 3/2003 Jacobson et al.
6,545,291 B1 4/2003 Amundson et al.
6,580,545 B2 6/2003 Morrison et al.
6,639,578 B1 10/2003 Comiskey et al.
6,657,772 B2 12/2003 Loxley
6,664,944 B1 12/2003 Albert et al.
6,672,921 B1 1/2004 Liang et al.
6,683,333 B2 1/2004 Kazlas et al.
6,704,133 B2 3/2004 Gates et al.
6,710,540 B1 3/2004 Albert et al.
6,721,083 B2 4/2004 Jacobson et al.
6,724,519 B1 4/2004 Comiskey et al.
6,727,881 B1 4/2004 Albert et al.
6,753,999 B2 6/2004 Zehner et al.
6,788,449 B2 9/2004 Liang et al.
6,816,147 B2 11/2004 Albert
6,819,471 B2 11/2004 Amundson et al.
6,822,782 B2 11/2004 Honeyman et al.
6,825,068 B2 11/2004 Denis et al.
6,825,829 B1 11/2004 Albert et al.
6,825,970 B2 11/2004 Goenaga et al.
6,831,769 B2 12/2004 Holman et al.
6,839,158 B2 1/2005 Albert et al.
6,842,279 B2 1/2005 Amundson
6,842,657 B1 1/2005 Drzaic et al.
6,865,010 B2 3/2005 Duthaler et al.
6,866,760 B2 3/2005 Paolini, Jr. et al.
6,870,657 B1 3/2005 Fitzmaurice et al.
6,870,661 B2 3/2005 Pullen et al.
6,900,851 B2 5/2005 Morrison et al.
6,922,276 B2 7/2005 Zhang et al.
6,950,200 B1 9/2005 Yamada et al.
6,950,220 B2 9/2005 Abramson et al.
6,958,848 B2 10/2005 Cao et al.
6,967,640 B2 11/2005 Albert et al.
6,982,178 B2 * 1/2006 LeCain ................ G02F 1/1309 438/30
6,987,603 B2 1/2006 Paolini, Jr. et al.
7,002,728 B2 2/2006 Pullen et al.
7,012,600 B2 3/2006 Zehner et al.
7,012,735 B2 * 3/2006 Honeyman ................ C09J 9/02 359/245
7,023,430 B2 4/2006 Liu et al.
7,030,412 B1 4/2006 Drzaic et al.
7,030,854 B2 4/2006 Baucom et al.
7,034,783 B2 4/2006 Gates et al.
7,038,655 B2 5/2006 Herb et al.
7,072,095 B2 7/2006 Liang et al.
7,075,502 B1 7/2006 Drzaic et al.
7,075,703 B2 7/2006 O'Neil et al.
7,106,296 B1 9/2006 Jacobson
7,110,163 B2 9/2006 Webber et al.
7,110,164 B2 9/2006 Paolini, Jr. et al.
7,116,318 B2 10/2006 Amundson et al.
7,116,466 B2 10/2006 Whitesides et al.
7,119,759 B2 10/2006 Zehner et al.
7,119,772 B2 10/2006 Amundson et al.
7,170,670 B2 1/2007 Webber
7,173,752 B2 2/2007 Doshi et al.
7,176,880 B2 2/2007 Amundson et al.
7,190,008 B2 3/2007 Amundson et al.
7,193,625 B2 3/2007 Danner et al.
7,202,847 B2 4/2007 Gates
7,202,991 B2 4/2007 Zhang et al.
7,206,119 B2 4/2007 Honeyman et al.
7,223,672 B2 5/2007 Kazlas et al.
7,230,750 B2 6/2007 Whitesides et al.
7,230,751 B2 6/2007 Whitesides et al.
7,236,291 B2 6/2007 Kaga et al.
7,256,766 B2 8/2007 Albert et al.
7,259,744 B2 8/2007 Arango et al.
7,312,916 B2 12/2007 Pullen et al.
7,321,459 B2 1/2008 Masuda et al.
7,327,511 B2 2/2008 Whitesides et al.
7,339,715 B2 3/2008 Webber et al.
7,365,733 B2 4/2008 Duthaler et al.
7,369,299 B2 5/2008 Sakurai et al.
7,388,572 B2 6/2008 Duthaler et al.
7,411,719 B2 8/2008 Paolini, Jr. et al.
7,420,549 B2 9/2008 Jacobson et al.
7,492,339 B2 2/2009 Amundson
7,495,819 B2 2/2009 Sakurai et al.
7,525,719 B2 4/2009 Yakushiji et al.
7,528,822 B2 5/2009 Amundson et al.
7,551,345 B2 * 6/2009 Uchida ................ G02F 1/1339 345/84
7,554,712 B2 6/2009 Patry et al.
7,561,324 B2 7/2009 Duthaler et al.
7,602,374 B2 10/2009 Zehner et al.
7,612,760 B2 11/2009 Kawai
7,636,191 B2 12/2009 Duthaler et al.

(56) References Cited

U.S. PATENT DOCUMENTS 7,646,530 B2 1/2010 Takagi et al.
7,649,674 B2 * 1/2010 Danner ................ G02F 1/1679 359/245
7,667,684 B2 2/2010 Jacobson et al.
7,679,599 B2 3/2010 Kawai
7,705,823 B2 4/2010 Nihei et al.
7,715,088 B2 5/2010 Liang et al.
7,728,811 B2 6/2010 Albert et al.
7,839,564 B2 11/2010 Whitesides et al.
7,893,435 B2 2/2011 Kazlas et al.
7,952,557 B2 5/2011 Amundson
7,999,787 B2 8/2011 Amundson et al.
8,064,962 B2 11/2011 Wilcox et al.
8,115,729 B2 2/2012 Danner et al.
8,129,655 B2 3/2012 Jacobson et al.
8,139,050 B2 3/2012 Jacobson et al.
8,503,065 B2 8/2013 Hsieh et al.
8,520,285 B2 8/2013 Fike et al.
8,558,783 B2 10/2013 Wilcox et al.
8,598,787 B2 12/2013 Cornelis et al.
8,753,711 B2 6/2014 Eriat et al.
8,928,562 B2 1/2015 Gates et al.
10,503,041 B2 12/2019 Harris et al.
11,378,824 B2 7/2022 Bull
2001/0040651 A1 * 11/2001 Toko ...................... G02F 1/167 349/86
2002/0060321 A1 5/2002 Kazlas et al.
2002/0090980 A1 7/2002 Wilcox et al.
2003/0102858 A1 6/2003 Jacobson et al.
2004/0027327 A1 * 2/2004 LeCain ................ G02F 1/1675 345/107
2004/0061920 A1 * 4/2004 Tonar ............... B32B 17/10036 359/265
2004/0105036 A1 6/2004 Danner et al.
2004/0119681 A1 6/2004 Albert et al.
2005/0012980 A1 1/2005 Wilcox et al.
2005/0122306 A1 6/2005 Wilcox et al.
2005/0122563 A1 6/2005 Honeyman et al.
2005/0156340 A1 7/2005 Valianatos et al.
2005/0253777 A1 11/2005 Zehner et al.
2006/0087479 A1 4/2006 Sakurai et al.
2006/0087489 A1 4/2006 Sakurai et al.
2006/0209008 A1 9/2006 Nihei et al.
2006/0214906 A1 9/2006 Kobayashi et al.
2007/0146309 A1 * 6/2007 Uchida ................ G02F 1/1339 345/107
2007/0152956 A1 * 7/2007 Danner ................ G02F 1/1679 345/107
2015/0351167 A1 12/2015 Moro et al.
2020/0032081 A1 1/2020 Kann et al.
2021/0247656 A1 8/2021 Murari et al.
2021/0325758 A1 * 10/2021 Huang ................. G02F 1/1675

FOREIGN PATENT DOCUMENTS

WO 1999067678 A2 12/1999
WO 2000005704 A1 2/2000
WO 2000036560 A1 6/2000
WO 2000038000 A1 6/2000
WO 2000067110 A1 11/2000
WO 2004079442 A1 9/2004

OTHER PUBLICATIONS

Wood, D., "An Electrochromic Renaissance?" Information Display, 18(3), 24 (Mar. 2002).

Bach, Udo et al., "Nanomaterials-Based Electrochromics for Paper-Quality Displays", Adv. Mater, vol. 14, No. 11, pp. 345-348, (Jun. 5, 2002).

Kitamura, T. et al., "Electrical toner movement for electronic paper-like display", Asia Display/IDW '01, pp. 1517-1520, Paper HCS1-1 (2001).

Yamaguchi, Y. et al., "Toner display using insulative particles charged triboelectrically", Asia Display/IDW '01, pp. 1729-1730, Paper AMD4-4 (2001).

Hayes, R.A. et al., "Video-Speed Electronic Paper Based on Electrowetting", Nature, vol. 425, No. 25, pp. 383-385 (Sep. 2003).

* cited by examiner 300
380
342
370

Viewer
400
380
370
342
110
140
160
121
126
120
130
150
122
141
161
125
155

500D 700A
725
755

FIG. 7A 700B
725
796
796
EPOXY
795
755

Relative Humidity (%)
60
59.5
59
58.5
58
57.5
57
56.5
56
55.5
0
5
10
15
20
25
30
Distance from Edge of FPL (mm)
805ag
Pinch-seal with air gap: 70C/23%RH 5 days
805uv
Pinch-seal with UV A80 resin: 70C/23%RH 5 days
810uv
Pinch-seal with UV A80 resin: 70C/23%RH 10 days
810ag
Pinch-seal with air gap: 70C/23%RH 10 days

ELECTRO-OPTIC DISPLAYS WITH EDGE SEAL COMPONENTS AND METHODS OF MAKING THE SAME

CROSS REFERENCE TO RELATED APPLICATIONS

This application claims priority to U.S. Provisional Patent Application No. 63/313,974 filed on Feb. 25, 2022, the entire contents of which are incorporated herein by reference. Further, the entire contents of any patent, published application, or other published work referenced herein are incorporated by reference in their entireties.

BACKGROUND OF THE INVENTION

The present invention relates to an electro-optic display having an edge seal. This invention also provides processes for the production of such electro-optic displays. This invention is particularly, but not exclusively, intended for use with displays comprising encapsulated electrophoretic media. However, the invention can also make use of various other types of electro-optic media which are "solid" in the sense that they have solid external surfaces, although the media may, and often do, have internal cavities which contain a fluid (either liquid or gas). Such "solid electro-optic displays" includes encapsulated electrophoretic displays, encapsulated liquid crystal displays, and other types of displays discussed below.

Electro-optic displays comprise a layer of electro-optic material, a term which is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Patent Application Publication No. 2002/0180687 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870.657; and 6,950,220. This type of medium is also typically bistable.

Another type of electro-optic display, which has been the subject of intense research and development for a number of years, is the particle-based electrophoretic display, in which a plurality of charged particles move through a suspending fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Patent Application Publication No. 2005/0001810; European Patent Applications 1,462,847; 1,482,354; 1,484,635; 1,500,971; 1,501,194; 1,536,271; 1,542,067; 1,577,702; 1,577,703; and 1,598,694; and International Applications WO 2004/090626; WO 2004/079442; and WO 2004/001498. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation have recently been published describing encapsulated electrophoretic media. Such encapsulated media comprise numerous small capsules, each of which itself comprises an internal phase containing electrophoretically-mobile particles suspended in a liquid suspending medium, and a capsule wall surrounding the internal phase. Typically, the capsules are themselves held within a polymeric binder to form a coherent layer positioned between two electrodes. Encapsulated media of this type are described, for example, in U.S. Pat. Nos. 5,930,026; 5,961,804; 6,017,584; 6,067,185; 6,118,426; 6,120,588; 6,120,839; 6,124,851; 6,130,773; 6,130,774; 6,172,798; 6,177,921; 6,232,950; 6,249,271; 6,252,564; 6,262,706; 6,262,833; 6,300,932; 6,312,304; 6,312,971; 6,323,989; 6,327,072; 6,376,828; 6,377,387; 6,392,785; 6,392,786; 6,413,790; 6,422,687; 6,445,374; 6,445,489; 6,459,418; 6,473,072; 6,480,182; 6,498,114; 6,504,524; 6,506,438; 6,512,354; 6,515,649; 6,518,949; 6,521,489; 6,531,997; 6,535,197; 6,538,801; 6,545,291; 6,580,545; 6,639,578; 6,652,075; 6,657,772; 6,664,944; 6,680,725; 6,683,333; 6,704,133; 6,710,540; 6,721,083; 6,724,519; 6,727,881; 6,738,050; 6,750,473; 6,753,999; 6,816,147; 6,819,471; 6,822,782; 6,825,068; 6,825,829; 6,825,970; 6,831,769; 6,839,158; 6,842,167; 6,842,279; 6,842,657; 6,864,875; 6,865,010; 6,866,760; 6,870,661; 6,900,851; 6,922,276; 6,950,200; 6,958,848; 6,967,640; 6,982,178; 6,987,603; 6,995,550; 7,002,728; 7,012,600; 7,012,735; 7,023,430; 7,030,412; 7,030,854; 7,034,783; 7,038,655; 7,061,663; 7,071,913; 7,075,502; 7,075,703; 7,079,305; 7,106,296; 7,109,968; 7,110,163; 7,110,164; 7,116,318; 7,116,466; 7,119,759; and 7,119,772; and U.S. Patent Application Publication Nos. 2002/0060321; 2002/0090980; 2002/0180687; 2003/0011560; 2003/0102858; 2003/0151702; 2003/0222315; 2004/0014265; 2004/0075634; 2004/0094422; 2004/0105036; 2004/0112750; 2004/0119681; 2004/0136048; 2004/0155857; 2004/0180476; 2004/0190114; 2004/0196215; 2004/0226820; 2004/0239614; 2004/0257635; 2004/0263947; 2005/0000813; 2005/0007336; 2005/0012980; 2005/0017944; 2005/0018273; 2005/0024353; 2005/0062714; 2005/0067656; 2005/0078099; 2005/0099672; 2005/0122284; 2005/0122306; 2005/0122563; 2005/0122565; 2005/0134554; 2005/0146774; 2005/0151709; 2005/0152018; 2005/0152022; 2005/0156340; 2005/0168799; 2005/0179642; 2005/0190137; 2005/0212747; 2005/0213191; 2005/0219184; 2005/0253777; 2005/0270261; 2005/0280626; 2006/0007527; 2006/0024437; 2006/0038772; 2006/0139308; 2006/0139310; 2006/0139311; 2006/0176267; 2006/0181492; 2006/0181504; 2006/0194619; 2006/0197736; 2006/0197737; 2006/0197738; 2006/0198014; 2006/0202949; and 2006/0209388; and International Applications Publication Nos. WO 00/38000; WO 00/36560; WO 00/67110; and WO 01/07961; and European Patents Nos. 1,099,207 B1; and 1,145,072 B1.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the suspending fluid are not encapsulated within microcapsules but instead are retained within a plurality of cavities formed within a carrier medium, typically a polymeric film. See, for example, International Application Publication No. WO 02/01281, and published US Application No. 2002/0075556, both assigned to Sipix Imaging, Inc.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

Other types of electro-optic materials may also be used in the present invention. Of particular interest, bistable ferroelectric liquid crystal displays (FLC's) are known in the art.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, the aforementioned U.S. Pat. Nos. 6,130,774 and 6,172,798, and 5,872,552; 6,144,361; 6,271,823; 6,225,971; and 6,184,856. Dielectrophoretic displays, which are similar to electrophoretic displays but rely upon variations in electric field strength, can operate in a similar mode; see U.S. Pat. No. 4,418,346.

An encapsulated or microcell electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition; and other similar techniques.) Thus, the resulting display can be flexible. Further, because the display medium can be printed (using a variety of methods), the display itself can be made inexpensively.

An electro-optic display normally comprises a layer of electro-optic material and at least two other layers disposed on opposed sides of the electro-optic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electro-optic display, which is intended for use with a stylus, print head or similar movable electrode separate from the display, only one of the layers adjacent the electro-optic layer comprises an electrode, the layer on the opposed side of the electro-optic layer typically being a protective layer intended to prevent the movable electrode damaging the electro-optic layer.

The manufacture of a three-layer electro-optic display normally involves at least one lamination operation. For example, in several of the aforementioned MIT and E Ink patents and applications, there is described a process for manufacturing an encapsulated electrophoretic display in which an encapsulated electrophoretic medium comprising capsules in a binder is coated on to a flexible substrate comprising indium-tin-oxide (ITO) or a similar conductive coating (which acts as an one electrode of the final display) on a plastic film, the capsules/binder coating being dried to form a coherent layer of the electrophoretic medium firmly adhered to the substrate. Separately, a backplane, containing an array of pixel electrodes and an appropriate arrangement of conductors to connect the pixel electrodes to drive circuitry, is prepared. To form the final display, the substrate having the capsule/binder layer thereon is laminated to the backplane using a lamination adhesive. (A very similar process can be used to prepare an electrophoretic display usable with a stylus or similar movable electrode by replacing the backplane with a simple protective layer, such as a plastic film, over which the stylus or other movable electrode can slide.) In one form of such a process, the backplane is itself flexible and is prepared by printing the pixel electrodes and conductors on a plastic film or other flexible substrate. The obvious lamination technique for mass production of displays by this process is roll lamination using a lamination adhesive. Similar manufacturing techniques can be used with other types of electro-optic displays. For example, a microcell electrophoretic medium or a rotating bichromal member medium may be laminated to a backplane in substantially the same manner as an encapsulated electrophoretic medium.

As discussed in the aforementioned U.S. Pat. No. 6,982,178, many of the components used in solid electro-optic displays, and the methods used to manufacture such displays, are derived from technology used in liquid crystal displays (LCD's), which are of course also electro-optic displays, though using a liquid rather than a solid medium. For example, solid electro-optic displays may make use of an active matrix backplane comprising an array of transistors or diodes and a corresponding array of pixel electrodes, and a "continuous" front electrode (in the sense of an electrode which extends over multiple pixels and typically the whole display) on a transparent substrate, these components being essentially the same as in LCD's. However, the methods used for assembling LCD's cannot be used with solid electro-optic displays. LCD's are normally assembled by forming the backplane and front electrode on separate glass substrates, then adhesively securing these components together leaving a small aperture between them, placing the resultant assembly under vacuum, and immersing the assembly in a bath of the liquid crystal, so that the liquid crystal flows through the aperture between the backplane and the front electrode. Finally, with the liquid crystal in place, the aperture is sealed to provide the final display.

This LCD assembly process cannot readily be transferred to solid electro-optic displays. Because the electro-optic material is solid, it must be present between the backplane and the front electrode before these two integers are secured to each other. Furthermore, in contrast to a liquid crystal material, which is simply placed between the front electrode and the backplane without being attached to either, a solid electro-optic medium normally needs to be secured to both; in most cases the solid electro-optic medium is formed on the front electrode, since this is generally easier than forming the medium on the circuitry-containing backplane, and the front electrode/electro-optic medium combination is then laminated to the backplane, typically by covering the entire surface of the electro-optic medium with an adhesive and laminating under heat, pressure and possibly vacuum.

Electro-optic displays are often costly; for example, the cost of the color LCD found in a portable computer is typically a substantial fraction of the entire cost of the computer. As the use of electro-optic displays spreads to devices, such as cellular telephones and personal digital assistants (PDA's), much less costly than portable computers, there is great pressure to reduce the costs of such displays. The ability to form layers of some solid electro-optic media by printing techniques on flexible substrates, as discussed above, opens up the possibility of reducing the cost of electro-optic components of displays by using mass production techniques such as roll-to-roll coating using commercial equipment used for the production of coated papers, polymeric films and similar media. However, such equipment is costly and the areas of electro-optic media presently sold may be insufficient to justify dedicated equipment, so that it may typically be necessary to transport the coated medium from a commercial coating plant to the plant used for final assembly of electro-optic displays without damage to the relatively fragile layer of electro-optic medium.

Also, most prior art methods for final lamination of electrophoretic displays are essentially batch methods in which the electro-optic medium, the lamination adhesive and the backplane are only brought together immediately prior to final assembly, and it is desirable to provide methods better adapted for mass production.

The aforementioned U.S. Pat. No. 6,982,178 describes a method of assembling a solid electro-optic display (including a particle-based electrophoretic display) which is well adapted for mass production. Essentially, this copending application describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will be normally be viewed through the electrically-conductive layer and adjacent substrate (if present). The substrate will be typically be a polymeric film, and will normally have a thickness in the range of about 1 to about 25 mil (25 to 634 μm), preferably about 2 to about 10 mil (51 to 254 μm). The electrically-conductive layer is conveniently a thin metal layer of, for example, aluminum or ITO, or may be a conductive polymer. Poly(ethylene terephthalate) (PET) films coated with aluminum or ITO are available commercially, for example as "aluminized Mylar" ("Mylar" is a Registered Trade Mark) from E.I. du Pont de Nemours & Company, Wilmington DE, and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

The aforementioned 2004/0155857 describes a so-called "double release film" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The aforementioned U.S. Pat. No. 7,839,564 also describes various methods designed for high volume manufacture of electro-optic displays using inverted front plane laminates. Some forms of these methods are "multi-up" methods designed to allow lamination of components for a plurality of electro-optic displays at one time.

The aforementioned U.S. Pat. No. 6,982,178 also describes the importance of protecting the electro-optic medium from environmental contaminants, since some electro-optic media are sensitive to humidity and ultra-violet radiation, and most such media are susceptible to mechanical damage. This patent illustrates, in FIG. 10, a process in which a protective film is laminated over a front plane laminate in the same lamination operation by which the front plane laminate is laminated to a backplane; such a protective film can protect the electro-optic medium against ingress of moisture, other liquids, and some gases. However, even with such a protective film, the edge of the electro-optic medium is still exposed to the environment, and this patent teaches that it is also advisable for the display to include an edge seal, which serves to prevent the ingress of moisture and other contaminants around the outer edges of the display. Various types of edge seal are illustrated in FIGS. 11-17 of this patent. This edge seal can be composed of metallized foil or other barrier foil adhered over the edge of the FPL, dispensed sealants (thermal, chemical, and/or radiation cured), polyisobutylene or acrylate-based sealants, and so on. It has been found that hybrid radiation and thermal cure sealants (i.e. UV curable with thermal post-bake) offer certain advantages to display system performance. Threebond 30Y-491 material (from Threebond Corporation, Cincinnati, OH) has been found to have favorable water vapor barrier properties, low viscosity at elevated temperature for easy dispensing of the edge seal material, good wetting characteristics, and manageable curing properties. Those skilled in the art and familiar with advanced sealants will be able to identify other sealants that offer comparable performance.

FIG. 20 of the aforementioned U.S. Pat. No. 6,982,178 shows an electro-optic display having front protective layers and an edge seal. This display comprises a thin film transistor (TFT) backplane generally similar to backplanes used with liquid crystal displays and having a matrix of pixel electrodes and associated thin film transistors and conductors for independently controlling the voltage applied to the pixel electrodes. A tape connect package is connected to a peripheral portion of the backplane and is provided with a driver integrated circuit (which controls the operation of the display); the tape connect package is also connected to a printed circuit board which contains additional circuitry for controlling the operation of the display.

On the upper surface (as illustrated in the aforementioned FIG. 20) of the backplane are disposed a layer of lamination adhesive, a layer of an electro-optic medium, a front electrode and a front substrate; the front electrode and front substrate are both conveniently formed from an indium-tin-oxide coated polymeric film, and as already noted such coated films are readily available commercially. The lamination adhesive layer, the electro-optic layer, the front electrode and front substrate are all derived from a front plane laminate which has been laminated to the backplane. One portion of the front electrode and front substrate extend beyond the electro-optic layer, and in the extended portion of the front electrode and front substrate, a conductive via formed from silver ink electrically connects the front electrode to circuitry provided on the backplane, while an adhesive layer secures the extended portion of the front electrode to the backplane.

Over the front substrate are disposed in succession a first layer of optically clear adhesive, a barrier film, a second layer of optically clear adhesive and a further, relatively thick protective film provided on its exposed surface with an anti-glare coating. The protective film acts to block ultra-violet radiation from reaching the electro-optic layer, and also prevents atmospheric moisture or other contaminants reaching this layer.

In order to form a complete seal around the electro-optic layer, the barrier film, the second layer of optically clear adhesive and the protective film are all made larger in both dimensions than the front substrate, so that these layers have peripheral portions which extend or "overhang" the outer edges of the front substrate. To complete the sealing of the electro-optic layer, a curable edge sealing material is injected, typically via a needle dispenser, into the area of the overhang, and cured to form an edge seal completely surrounding the electro-optic layer.

FIG. 3 of the aforementioned U.S. Pat. No. 7,649,674 shows another embodiment of an electro-optic display having a front protective or barrier layer and an edge seal. This display also comprises a backplane on which are disposed a layer of lamination adhesive, a layer of an electro-optic medium, and a front substrate including an electrically-conductive film or coating. The backplane is larger than the layers of lamination adhesive, electro-optic medium, and front substrate in both the length and width dimensions. Accordingly, a peripheral portion of the backplane extends beyond the outer edges of these layers all around their periphery.

The display further comprises a front protective or barrier sheet laminated or otherwise applied on to the front substrate. The barrier sheet is made larger than the front substrate in both the length and width dimensions, such that the barrier sheet has peripheral portions which extend or "overhang" the outer edges of the front substrate. The overhanging portions of the barrier sheet are "pinched" down over the edges of the lamination adhesive, electro-optic medium, and front substrate, and are sealed to the peripheral portion of the backplane to form a pinched edge seal. The barrier sheet can be melted to the surface of the backplane using, for example, laser or ultrasonic welding. Alternatively, an adhesive can be used to secure the overhanging portions of the barrier sheet to the backplane.

SUMMARY OF THE INVENTION

Edge seals such as those incorporated in FIG. 20 of U.S. Pat. No. 6,982,178, summarized above, can be effective in preventing ingress of moisture and other environmental contaminants into the electro-optic medium. However, one of the advantages of encapsulated electrophoretic and other electro-optic media, for example, organic light emitting diode (OLED) and microcell media, is that they are sufficiently flexible to be used in flexible displays. The aforementioned edge seal, and similar edge seals, however, are not suitable for use in flexible displays since the curable edge sealing material imparts rigidity to the display once fully cured. These types of edge seals can also add complexity to the display manufacturing process associated with accurately dispensing the sealing material around the periphery of the backplane.

The edge seals incorporated in FIG. 3 of U.S. Pat. No. 7,649,674, summarized above, maintain the flexibility of the electro-optic display as they do not utilize a curable edge sealing material. However, it has been found that the regions where the pinched portions of the barrier sheet are adhered to the surface of the backplane can be moisture diffusion pathways along the edges of an electro-optic display.

Measures to reduce or mitigate the edge moisture diffusion effects typically include increasing the width of the optically inactive area around the outer perimeter of the electro-optic material and/or increasing the width of the pinched portions of the barrier sheet. However, implementing either of these mitigating measures imposes trade-offs on the design of the end product incorporating the electro-optic display. For example, for a display housing of a given height and width, increasing the inactive area around the edges of the electro-optic material or the width of the pinched portions of the barrier sheet effectively reduces the viewable area of the display and requires a housing with a wider bezel portion to hide these unusable regions. Alternatively, if the size of the viewable area is a fixed design requirement, the dimensions of the display housing must be increased in order to achieve the requisite viewable area.

Additionally, when creating large-format flexible displays, such as might be used for wrapping busses or buildings, the edges are more likely to become compromised during handling and installation. This is also true for after-market variable transmission films which may be, for example, installed atop an existing window in a building or an existing window in a vehicle, such as a window of a passenger bus or a moon roof of an automobile. If the edges or corners of such devices are compromised, moisture ingress may diminish the performance or even result in electrical shorts or delamination.

Accordingly, the edge seal technology described herein includes features for addressing the deficiencies of conventional edge seals.

Accordingly, in one aspect, the subject matter presented herein provides for an electro-optic display comprising a backplane including at least one electrode, a layer of an electro-optic material disposed adjacent to the backplane, a light-transmissive electrically-conductive layer disposed on the opposite side of the layer of electro-optic material from the backplane, a rod member disposed laterally adjacent to the backplane, the layer of an electro-optic material, and the light-transmissive electrically-conductive layer, a first barrier layer disposed adjacent to the light-transmissive electrically-conductive layer and a first side of the rod member, a second barrier layer disposed on the backplane and a second side of the rod member, the second side being the opposite side of the rod member from the first side, and a flexible barrier tape extending from an edge portion of the first barrier layer, around the rod member, to an edge portion of the second barrier layer.

In some embodiments, the electro-optic display further includes an edge sealing material within the flexible barrier tape. The edge sealing material is disposed at a first end of the rod member adjacent to a first corner of the electro-electro-optic display, and at a second end of the rod member adjacent to a second corner of the electro-electro-optic display.

In some embodiments, the edge sealing material is a UV-curable resin. In some embodiments, the edge sealing material has a water vapor transmission rate between 2-3 g/m2/day at 60° C. and 90% relative humidity. In some embodiments, the barrier tape further includes an adhesive layer on a surface of the barrier tape that contacts the edge portion of the first barrier layer, the rod member, and the edge portion of the second barrier layer.

In some embodiments, the rod member is cylindrical and has an average diameter of between about 0.254 mm and about 2.54 mm. In some embodiments, the rod member is integrated into the barrier tape. In some embodiments, the rod member is positioned substantially along a lengthwise center of the barrier tape.

In some embodiments, the barrier tape further includes a layer of electrically insulating material disposed on a surface of the barrier tape that contacts the edge portion of the first barrier layer, the rod member, and the edge portion of the second barrier layer. In some embodiments, the barrier tape further comprises a metal foil layer disposed on a surface of the barrier tape opposite the surface that contacts the edge portion of the first barrier layer, the rod member, and the edge portion of the second barrier layer. In some embodiments, the barrier tape comprises a layer of adhesive material disposed on a first half of a lengthwise surface of the barrier tape and a layer of metal foil disposed on a second half of the lengthwise surface of the barrier tape. In some embodiments, the barrier tape comprises a colorant.

In another aspect, the subject matter presented herein provides an electro-optic display comprising a backplane including at least one electrode, a layer of electro-optic material disposed adjacent to the backplane, a light-transmissive electrically-conductive layer disposed on the opposite side of the layer of electro-optic material from the backplane, and a corner barrier seal disposed at each corner of the electro-optic display. The corner barrier seal includes a barrier material including a square shape in an unfolded state, first, second, and third fold lines, where the first and second fold lines are perpendicular to each other and the third fold line is substantially 45 degrees from the first and second fold lines, and where the first, second, and third fold lines bisect one another and the barrier material, and the first and second fold lines being folded in an upward direction, and the third fold line being folded in a downward direction forming first and second corner pockets.

In some embodiments, the electro-optic display further includes forming the square-shaped barrier material into an X-shape in the unfolded state. In some embodiments, the corner barrier seal further includes an adhesive layer disposed on an inner surface of the first and second corner pockets.

In some embodiments, the layer of electro-optic material and the light-transmissive electrically-conductive layer are disposed within the first corner pocket of each corner barrier seal, and the backplane is disposed within the second corner pocket of each corner barrier seal. In some embodiments, the layer of electro-optic material, the light-transmissive electrically-conductive layer, and the backplane are disposed within the first corner pocket or the second corner pocket of each corner barrier seal.

In some embodiments, the electro optic display further includes a first barrier layer disposed on the light-transmissive electrically-conductive layer and a first surface of each corner barrier seal, and a second barrier layer disposed on the backplane and a second surface of each corner barrier seal. In some embodiments, the first and second barrier layers are larger in both dimensions than the light-transmissive electrically-conductive layer, the layer of electro-optic material, and the backplane so as to leave peripheral portions of the first and second barrier layers extending beyond the edges of the light-transmissive electrically-conductive layer, the layer of electro-optic material, and the backplane respectively, and the peripheral portions of the first and second barrier layers are secured to each other, thereby sealing the edges of the electro-optic display.

In some embodiments, the electro-optic display further includes an edge sealing component extending around the periphery of the electro-optic display over an edge portion of the first barrier layer and an edge portion of the second barrier layer. In some embodiments, the edge sealing component is a barrier tape including polychlorotrifluoroethylene or aluminum oxide.

In another aspect, the subject matter presented herein provides a process for forming an electro-optic display. The process includes providing a front plane laminate including a layer of electro-optic material and a light-transmissive electrically-conductive layer, providing a backplane including at least one pixel electrode, where the backplane is larger in length and width dimensions than the front plane sub-assembly, laminating the front plane sub-assembly to the backplane, dispensing a curable edge seal material around the periphery of the backplane adjacent to the outer edges of the front plane sub-assembly, partially curing the curable edge seal material, laminating a barrier layer over the front plane sub-assembly and partially-cured edge seal material, the barrier layer being sized to overhang the partially-cured edge seal material, adhering an overhanging portion of the barrier layer to the surface of the backplane, and fully curing the curable edge seal material.

In some embodiments, a surface of the barrier layer comprises a layer of pressure sensitive adhesive. In some embodiments, partially curing the curable edge seal material comprises curing the curable edge seal material for between about 15 to 40 seconds.

In some embodiments, the curable edge seal material has a water vapor transmission rate between 2-3 g/m2/day at 60° C. and 90% relative humidity. In some embodiments, the curable edge seal material is a polymer including epoxies, urethanes, acrylates, or a combination thereof. In some embodiments, the curable edge seal material is UV-curable.

In another aspect, the subject matter presented herein provides an electro-optic display formed using the process described above.

In another aspect, the subject matter herein provides a variable transmission window including a display stack, a substrate, and an edge sealing material. The display stack includes a layer of an electro-optic material disposed between a bottom surface of a top light-transmissive electrically-conductive layer and a top surface of a bottom light-transmissive electrically-conductive layer, and a barrier layer disposed on a top surface of the top light-transmissive electrically-conductive layer. In some embodiments, a first adhesive layer is disposed between the barrier layer and the top light-transmissive electrically-conductive layer. The display stack is disposed on the substrate. In some embodiments, a length and width of the substrate are greater than a length and width of the display stack. In some embodiments, a second adhesive layer is disposed between the display stack and the substrate. The edge sealing material is disposed along a perimeter edge of the display stack and on a portion of the substrate. The edge sealing material includes a first horizontal section disposed on a portion of a top surface of the barrier layer, a vertical section disposed adjacent to the entirety of the outer edge of the display stack, and a second horizontal section disposed on a portion of a top surface of the substrate. In some embodiments, a third adhesive layer is disposed between the edge sealing material and both the display stack and substrate.

In some embodiments, the layer of an electro-optic material includes a plurality of microcells. In some embodiments, the layer of an electro-optic material includes a layer of sealing material disposed on an open end of the plurality of microcells. In some embodiments, the plurality of microcells each include a protrusion structure. In some embodiments, the protrusion structure is formed from one or more geometric shapes. In some embodiments, the protrusion structure is formed from a conical shape formed on a cylindrical shape.

These and other aspects of the present invention will be apparent in view of the following description.

BRIEF DESCRIPTION OF DRAWINGS

FIGS. 7A to 7E are schematic cross-sectional views illustrating steps of a method for manufacturing an electro-optic display with an enhanced pinched edge seal in accordance with the subject matter presented herein.

Figure 1:
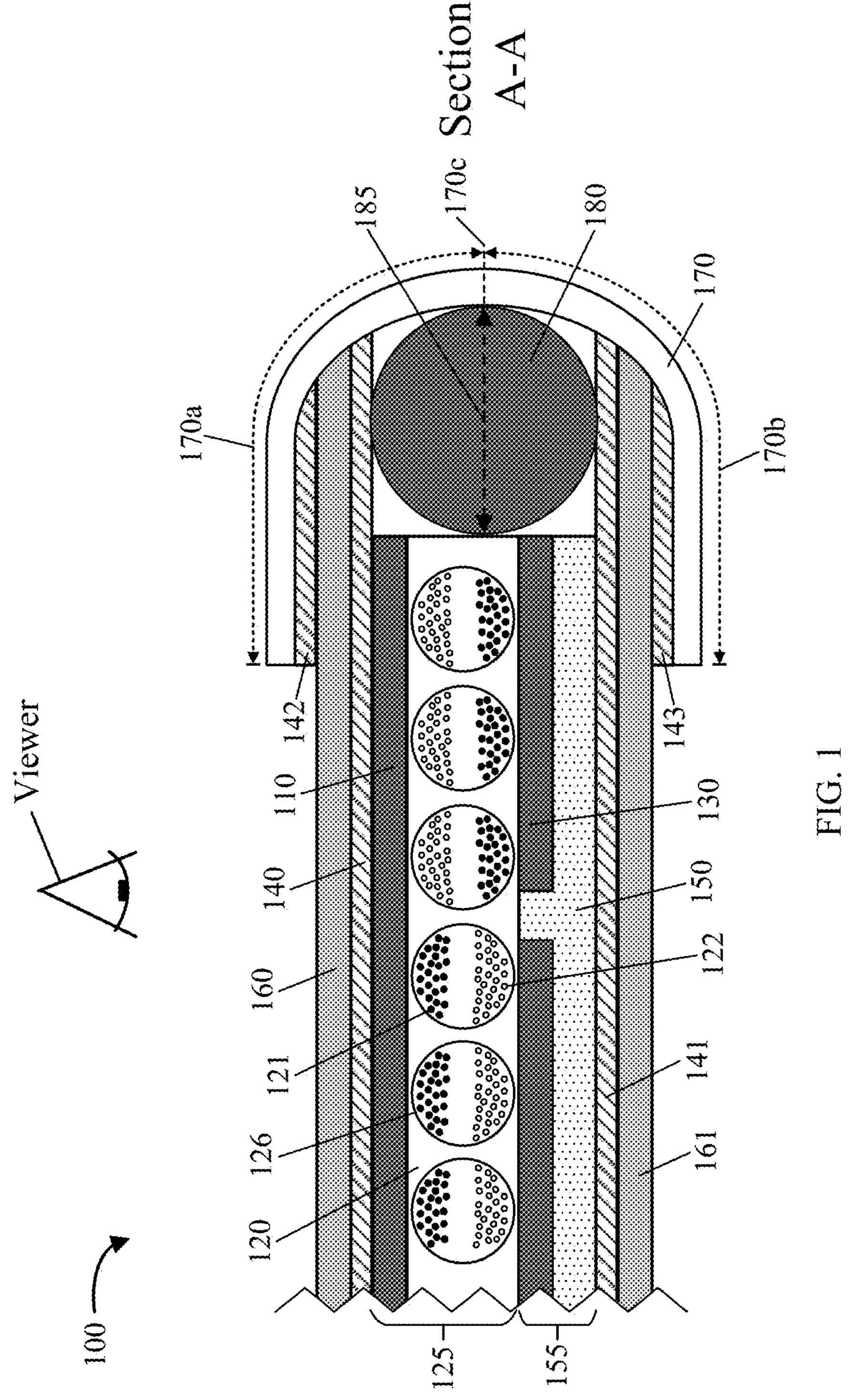
FIG. 1 is a cutaway view of a schematic cross-section showing an exemplary embodiment of a sealed electro-optic display in accordance with the subject matter presented herein.

It should be stressed that the accompanying drawings are schematic and not to scale. In particular, for ease of illustration, the thicknesses of the various layers in the drawings do not correspond to their actual thicknesses. Also, in all the drawings, the thicknesses of the various layers are greatly exaggerated relative to their lateral dimensions.

DETAILED DESCRIPTION OF THE INVENTION

Flexible, including rollable, electro-optic displays, especially those using encapsulated electrophoretic media, present important new marketing opportunities; for example, large displays which can be stored in a compact form may be useful as additional display devices on electronic devices which are presently equipped only with a small display screen but where a larger display screen would often be useful; examples of such devices include cellular telephones equipped to receive electronic mail. However, such flexible electro-optic displays will typically require sealing to prevent the ingress of water vapor and other environmental contaminants which can adversely affect the electro-optic properties or operating lifetime of the display. U.S. Pat. Nos. 6,982,178, 7,110,164, and 7,649,674 and Patent Publication No 2004/0155857 all discuss the sealing of electro-optic displays, but most of the displays there considered are rigid, being formed on glass or similar backplanes, and additional difficulties occur in choosing suitable sealing techniques for flexible displays. Both the structural characteristics and the barrier properties of the sealing materials used need to be carefully considered, as well as the construction of the final display, to provide adequate sealing in flexible displays.

As discussed in detail below, there are several approaches to sealing flexible displays using combinations of substrate, edge seal material and assembly techniques. For the purpose of subsequent discussion, the term "backplane" is used herein consistent with its conventional meaning in the art of electro-optic displays and in the aforementioned patents and published applications, to mean a rigid or flexible material provided with one or more electrodes. The backplane may also be provided with electronics for addressing the display, or such electronics may be provided in a unit separate from the backplane. In flexible displays, it is highly desirable that the backplane provide sufficient barrier properties to prevent ingress of moisture and other contaminants through the non-viewing side of the display (the display is of course normally viewed from the side remote from the backplane). If one or more additional barrier layers need to be added to the backplane to reduce ingress of moisture and other contaminants, the barrier layers should be located as closely as possible to the electro-optic layer so that little or no edge profile of low barrier material is present between the front (discussed below) and rear barrier layers.

The term "front substrate" is used herein consistent with its conventional meaning in the art of electro-optic displays and in the aforementioned patents and published applications, to mean a rigid or flexible material that is light-transmissive (and preferably transparent). The front substrate will typically comprise at least one electrode, most commonly a single continuous front electrode extending across the entire display. Typically, the exposed surface of the front substrate will form the viewing surface through which an observer views the display, although, as in some of the embodiments described below, there may be additional layers interposed between the front substrate and the viewing surface. As with the backplane, the front substrate needs to provide sufficient barrier properties to prevent ingress of moisture and other contaminants through the viewing side of the display.

Typically, an electro-optic display includes one or more barrier layers to prevent ingress of moisture, dirt, gasses, etc., or to prevent exit of fluids within the display. If one or more additional layers need to be added to the front substrate to reduce ingress of moisture and other contaminants, the barrier layers should be located as closely as possible to the electro-optic layer so that when the barrier layer drapes over the display there is little or no edge profile with respect to the back substrate.

As discussed in the aforementioned U.S. Pat. Nos. 7,649,674, 6,982,178 and 7,110,164 and Patent Publication No 2004/0155857, a common front substrate for electro-optic displays comprises a thin layer of ITO on PET, such coated films being readily available commercially, e.g., from Saint Gobain. In such a front substrate, the ITO layer serves as a barrier material, but in practice inevitably suffers from pinholes and cracks, through which moisture and other contaminants can penetrate to the electro-optic material. To increase the sealing properties of such a PET/ITO or similar front substrate, it is desirable to laminate a redundant barrier layer on to the front substrate, this redundant barrier layer being formed of a homopolymer (for example, polychlorotrifluoroethylene, available from Honeywell Corporation under the Registered Trade Mark "ACLAR"), or a sputtered ceramic (for example $AlO_x$, available from Toppan Printing Company under the trade name Toppan GX Film). In other embodiments, flexible glass, such as WILLOW® brand glass from Corning can be used. The redundant barrier layer should be thin to provide a flexible display, ideally about 12 μm, but could be as thick as 5 mil (127 μm) if sufficient flexibility is still available. Where an adhesive layer is required to attach the redundant barrier to the front substrate, the adhesive layer should be transparent, colorless, thin, flexible, have low creep (when the display is flexed or rolled), and be durable at all temperatures within the operating range of the display. Certain cross-linked polyurethanes and polyacrylates can be used as such adhesives. Suitable optically-clear adhesives are commercially available from Norland Adhesives.

Alternatively, the barrier properties of a PET/ITO or similar front substrate may be improved by coating a redundant metal oxide layer (for example, an alumina or zinc oxide layer) either on the opposed surface of the front substrate from the ITO layer or underneath the ITO layer. The combination of the ITO layer and the redundant metal oxide layer improves the barrier properties of the front substrate (for example by reducing migration of water vapor through the inevitable cracks and pinholes in the ITO layer) without undue yellowing of the substrate, such as would occur one attempted to improve barrier properties by increasing the thickness of the ITO layer. Instead of a simple metal oxide layer, a more complex structure containing a ceramic material, such as Barix (Registered Trade Mark) sealing material, available from Vitex Systems, Inc., 3047 Orchard Parkway, San Jose, CA 95134 could be used; again the barrier layer could be provided on the surface of the front substrate remote from the ITO layer or beneath the ITO layer. Vitex Systems currently sells a polymer film bearing both Barix and ITO layers under the trade name FlexGlass 200, but the polymeric film is 5 mil (127 μm) PEN.

The barrier properties of the front substrate, as well as properties such as flexibility, cost and other specialized properties, may also be controlled by careful choice of both the polymer and conductive material used in the front substrate. Almost any flexible, light-transmissive polymer may in principle be used; suitable polymers include PET, PEN, polycarbonate, poly(vinylidene chloride) (sold under the Registered Trade Mark "SARAN"), polychlorotrifluoroethylene (sold under the Registered Trade Marks "ACLAR" and "CLARIS"), triacetyl cellulose, the material sold under the Registered Trade Mark "ARTON" by JSR Company, polyethersulfone (PES) and laminates of two or more of these materials. Suitable transparent conductive materials include ITO, organic conductive polymers such as Baytron P (Registered Trade Mark), carbon nanotubes, and other suitably conducting light transmissive conductors (transmission greater than 60 percent) having resistivities of less an about $10^4$ ohms/square.

Exemplary embodiments of displays according to the present invention will now be described, by way of illustration only, with reference to the accompanying drawings. In all cases, the electro-optic layer may be an encapsulated electrophoretic layer, a polymer-dispersed electrophoretic layer, or any of the other types of electro-optic layer discussed above. The display may contain one or two lamination adhesive layers to attach the electro-optic material to the front substrate and/or the backplane. The display may be viewed through either lamination adhesive layer, and the display may be assembled by direct coating and lamination, or by the use of front plane laminates, inverted front plane laminates, or double release films, as described in the patents and applications mentioned in the "Reference to Related Applications" Section hereof. Although as mentioned above, the display is normally viewed through the front substrate, in some cases a light-transmissive backplane can be used to provide a double-sided display, or one operating in the aforementioned shutter mode. Such constructions may be used in variable transmission films, whereby the amount of light transmitted through the film can be altered electronically. In all the accompanying drawings, the electro-optic displays are illustrated with the viewing surface (alternatively called the front surface) of the display at the top, so that references hereinafter to front and rear surfaces refer to upper and lower surfaces respectively as illustrated in the relevant drawings.

FIG. 1 of the accompanying drawings is a cutaway view of a schematic cross-section showing an exemplary embodiment of a sealed electro-optic display 100 in accordance with the subject matter presented herein. In particular, FIG. 1 corresponds to Section A-A identified in FIG. 2D by cross-sectional plane cutting line 205.

Electro-optic display 100 typically includes a top transparent electrode 110, a layer of electrophoretic medium 120, and a bottom electrode 130, which often comprises a plurality of pixel electrodes of an active matrix of pixels controlled with thin film transistors (TFT). The electrophoretic medium 120 contains electrophoretic particle 121 and electrophoretic particle 122. Electrophoretic particle 121 and 122 may have different electrical charges and different optical characteristics. For example, electrophoretic particle 121 may be black and have a positive charge while electrophoretic particle 122 may be white and have a negative charge. However, in some embodiments, the electrophoretic medium 120 includes just a single type of electrophoretic particle, or three or more electrophoretic particles, each possibly having different optical, electro-optical, or chemical properties. The electrophoretic medium 120 typically includes a non-polar solvent, such as isoparaffins, and may also include dispersed polymers and charge control agents to facilitate state stability, e.g. bistability, i.e., the ability to maintain an electro-optic state without inputting any additional energy.

The electrophoretic medium 120 shown in FIG. 1 is compartmentalized by a plurality of microcapsules 126. However, in some embodiments, the electrophoretic medium 120 is compartmentalized by the walls of a plurality of microcells (not shown in FIG. 1). The structure formed of the top electrode 110 and layer of electrophoretic medium 120 (also referred to as FPL 125) is typically disposed on a substrate 150, which may be rigid or flexible. In some embodiments, FPL 125 is disposed on a backplane 155 which is an assembly including the bottom electrode 130 organized as a plurality of pixel electrodes, an array of thin film transistors (not shown in FIG. 1), and substrate 150. It is to be understood that in other embodiments, the bottom electrode 130 may be a single electrode, such as a carbon-paste electrode or a metal foil (not shown). Additionally, in some embodiments, the bottom electrode 130 may be light-transmissive and made from the same or similar materials as the top electrode 110.

Electro-optic display 100 typically also includes a top protective or barrier layer 160 for protecting the top electrode 110 from damage, and a bottom protective or barrier layer 161 for protecting the substrate 150 from damage. The top barrier layer 160 and the bottom barrier layer 161, together with the edge sealing components discussed in detail below, may envelop the entire electro-optic display 100 to prevent ingress of water and limit variations in relative humidity within the display. As shown in FIG. 1, the top barrier layer 160 and the bottom barrier layer 161 can extend beyond the periphery of the top electrode 110 and substrate 150.

Electro-optic display 100 can also include adhesive layer 140 between the top electrode 110 and the top barrier layer 160, and adhesive layer 141 between the substrate 150 and the bottom barrier layer 161. Although not shown in FIG. 1, Electro-optic display 100 can include one or more additional adhesive layers as needed (e.g., between the top electrode 110 and the layer of electrophoretic medium 120, between the layer of electrophoretic medium 120 and the backplane 155). In some embodiments the adhesive layers can include an integrated primer component to improve adhesion, or a separate primer layer (not shown in FIG. 1) can be used. (The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088; and 7,839,564, all of which are incorporated by reference herein in their entireties.) In some embodiments, the barrier layers are fabricated to include an integral adhesive material or layer on at least one surface.

Electro-optic display 100 can also include an edge seal formed by a flexible barrier tape 170 which extends along the outer perimeter of electro-optic display 100. As shown in FIG. 1, adhesive layer 142 adheres flexible barrier tape 170 to the top barrier layer 160, and adhesive layer 143 adheres flexible barrier tape 170 to the bottom barrier layer 161. Although drawn as distinct layers in FIG. 1, in some embodiments barrier tape 170 comprises an outer layer having good barrier characteristics and an integrated inner adhesive layer, which is used to secure the barrier tape 170 to the top and bottom barrier layers (160, 161) of the display.

In some embodiments, the barrier tape 170 has a thickness of about 12 μm, but could be as thick as 0.005" (127 μm). The barrier tape 170 can be formed from materials having good barrier characteristics including a polymer (for example, a homopolymer such as polychlorotrifluoroethylene or similar materials) or sputtered ceramic on PET, PEN, PC, or other transparent plastic. Alternatively, if transparency is not required, a metal foil such as aluminum can be used. These materials are designed to be flexible to a degree, but can crack if creased or bent at too severe of an angle. Accordingly, electro-optic display 100 includes a rod 180 positioned adjacent to the outer perimeter of electro-optic display 100 to contact the barrier tape 170 at its bend point. The bend radius of the barrier tape 170 can thus be controlled based on the average diameter 185 and position of the rod 180, thereby minimizing or eliminating the cracking of the barrier tape 170.

In some embodiments, rod 180 comprises a nylon fiber having an average diameter 185 of about 0.020" (0.508 mm). In some embodiments, rod 180 has an average diameter 185 of between about 0.010" (0.254 mm) and about 0.100" (2.54 mm). One of skill in the art will appreciate that the average diameter 185 of the road 180 can be set according to the thickness of the electro-optic display 100 and the desired bend radius of the barrier tape 170. The rod 180 can be formed from materials such as fluorinate organic compounds (e.g., fluorocarbons or similar materials), polymers (e.g., nylon, ultra-high-molecular-weight polyethylene (UHMWPE), high-modulus polyethylene (HMPE), polycarbonate, acrylic, polystyrene, or similar materials). In some embodiments, the rod 180 is formed from a glass fiber.

Figure 2A:
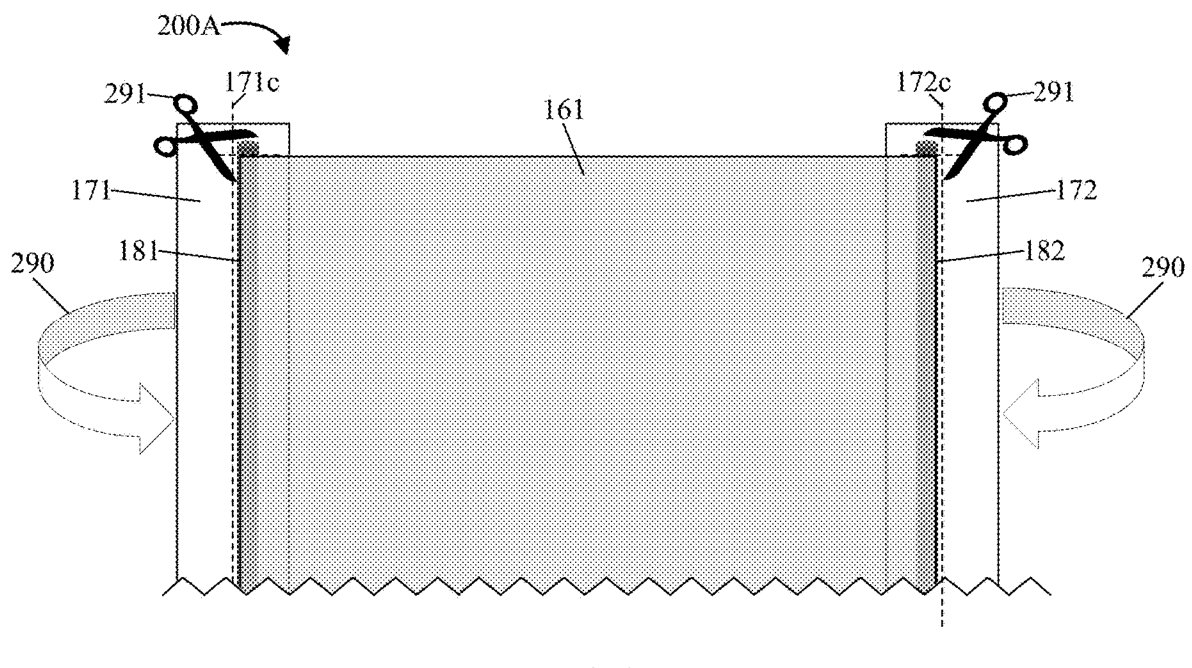
FIGS. 2A to 2D are cutaway top views illustrating steps of a method for manufacturing an electro-optic display with edge seal components in accordance with the subject matter presented herein.

FIGS. 2A to 2D are cutaway bottom views (e.g., viewed from the opposite side of the viewer denoted in FIG. 1) illustrating steps of a method for manufacturing an electro-optic display with edge seal components in accordance with the subject matter presented herein. FIG. 2A is a cutaway bottom view 200A illustrating edge seal components being added to an electro-optic display. The electro-optic display shown in FIG. 2A does not yet have any edge seal components (e.g., flexible barrier tape 170, rod 180, adhesive layer 142, and adhesive layer 143) applied, but is otherwise substantially equivalent to the electro-optic display 100 described in connection with FIG. 1.

The top barrier layer 160 (not shown in FIG. 2A) and the bottom barrier layer 161 (and their corresponding adhesive layers if separate components) can be sized such that they overhang each edge of the electro-optic display by an amount substantially equal to the diameter of the rod component that will be used to form each edge seal. In some embodiments, oversized sheets of barrier layer material are applied to the top and bottom of the electro-optic display 100, and are then subsequently trimmed to a desired size. In some embodiments, the top barrier layer 160 and the bottom barrier layer 161 are precut to predetermined size prior to being applied to the electro-optic display 100. Adhesive layer 142 and adhesive layer 143 are formulated and applied such that the top and bottom barrier layers can be affixed to the electro-optic display 100 without having the top and bottom overhanging portions of barrier material adhere together, but the adhesive is still tacky enough to hold the rod components in place until they are permanently secured into place by barrier tape, as described in detail below.

As shown in FIG. 2A, rod 181 is placed along an outer edge of electro-optic display 100 between the overhanging portions of top barrier layer 160 and bottom barrier layer 161. Prior to being applied to the electro-optic display 100, rod 181 can be precut to a predetermined length based on the dimensions of the electro-optic display 100. Alternatively, rod 181 can be trimmed (denoted by trim 291 and dashed lines in FIG. 2A) to the desired length (e.g., substantially the same length as top barrier layer 160 and bottom barrier layer 161) after being applied to the electro-optic display 100.

Barrier tape 171 is then applied to the top barrier layer 160 such that the lengthwise midpoint 171*c* of the barrier tape 171 is positioned adjacent to the outer edge of rod 181. In some embodiments, barrier tape 171 is applied to top barrier layer 160 such that the lengthwise midpoint 171*c* will be positioned substantially at or near the vertical midpoint of rod 181 when barrier tape 171 is subsequently applied to the bottom barrier layer 161 as described below. For example, see the position of the lengthwise midpoint 170*c* of rod 180 in FIG. 1.

As denoted by arrow 290, barrier tape 171 is then wrapped around rod 181 while keeping barrier tape 171 in intimate contact with rod 181 until the barrier tape 171 is applied to the bottom barrier layer 161. The round shape and diameter of rod 181 prevent the barrier tape 171 from creasing or being bent at a radius that could cause the barrier tape 171 to crack during or after application to the electro-optic display. A substantially similar process is used to place rod 182 and apply barrier tape 172 to the electro-optic display such that the lengthwise midpoint 172*c* will be positioned substantially at or near the vertical midpoint of rod 182 when barrier tape 172 is subsequently applied to the bottom barrier layer 161.

Although the barrier tape described in the embodiments herein is initially applied to the top barrier layer 160 and then subsequently the bottom barrier layer 161, one of skill in the art will appreciate that a process by which the barrier tape is initially be applied to the bottom barrier layer 161 is within the scope of this disclosure.

Figure 2B:
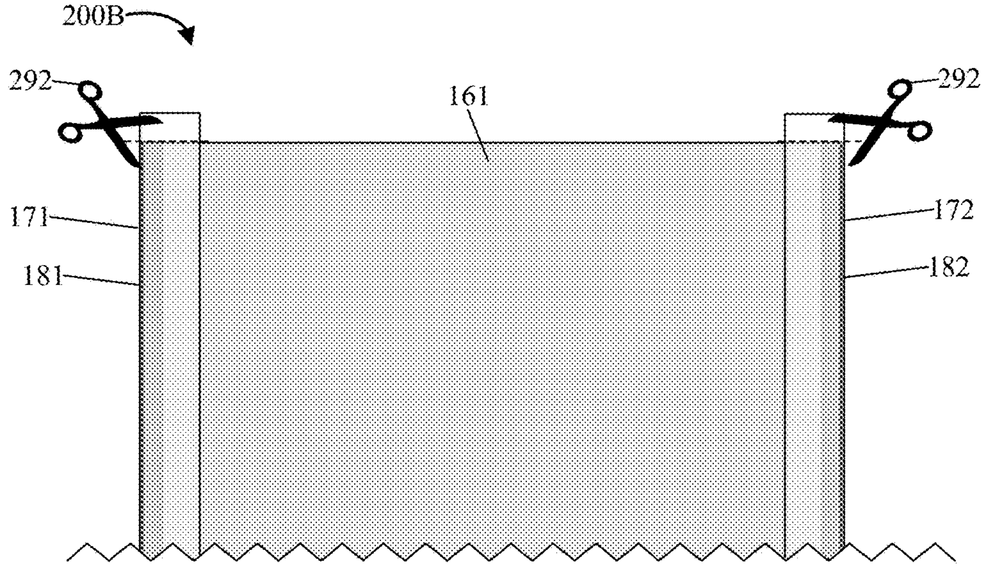

FIG. 2B is a cutaway bottom view 200B illustrating the electro-optic display with barrier tape 171 and barrier tape 172 applied. The portions of barrier tape 171 and barrier tape 172 that extend beyond the edges of the top barrier layer 160 and the bottom barrier layer 161 can be trimmed off, as denoted by trim 292 and dashed lines in FIG. 2B. In some embodiments, barrier tape 171 and barrier tape 172 are precut to a predetermined length based on the dimensions of the electro-optic display 100 and are applied such that they do not require trimming.

Figure 2C:
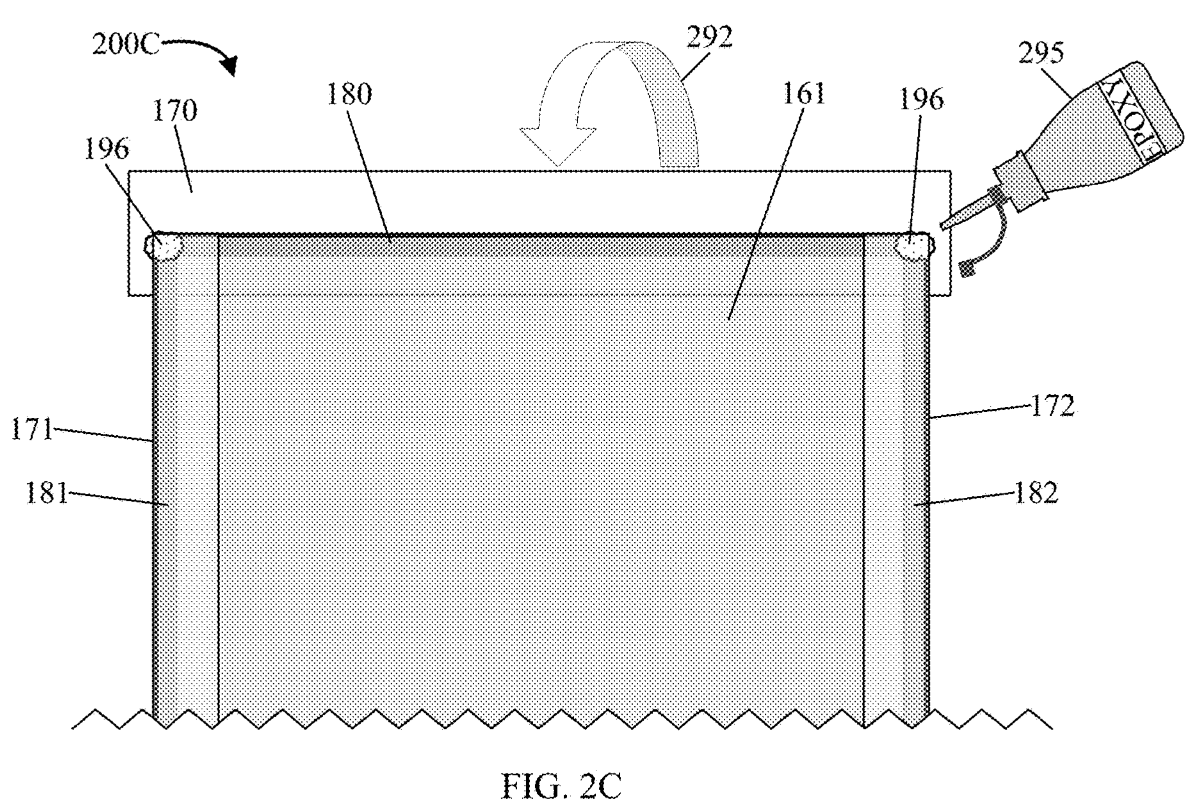

FIG. 2C is a cutaway bottom view 200C illustrating barrier tape 170 being applied to the electro-optic display. In a substantially similar process as described above, rod 180 is placed between the top barrier layer 160 and the bottom barrier layer 161, and barrier tape 170 is initially applied to the top barrier layer 160. However, prior to wrapping barrier tape 170 around rod 180, an edge sealing material 196 is applied at the corners of the electro-optic display. For example, a needle dispenser 295 can be used to apply edge sealing material 196 at the junctions where rods 181 and 182 meet with respective ends of rod 180.

Edge sealing material 196 can be composed of dispensed sealants (thermal, chemical, and/or radiation cured), polyisobutylene or acrylate-based sealants, and so on. In some embodiments, the curable edge sealing material 196 is a UV-curable resin having a low water vapor transmission rate (WVTR). WVTR is a measure of the water vapor permeability of a given material, i.e., the mass of water vapor that passes through a given area of material at a specified temperature and humidity over a given period of time. In some embodiments, the edge sealing material 196 is a material having a WVTR less than or equal to about 0.01 g/m2/day at 60° C. and 100% relative humidity. In some embodiments, edge sealing material 196 is a material having a WVTR between about 0.01 and about 2 g/m2/day at 60° C. and 90% relative humidity. It has been found that an edge sealing material 196 having a WVTR between 2-3 g/m2/day at 60° C. and 90% relative humidity (e.g., UV500 by HumiSeal, UV A80 by Cemedine Co., Ltd.), can be effective as a moisture barrier in some embodiments. It has also been found that hybrid radiation and thermal cure sealants (i.e. UV curable with thermal post-bake) offer certain advantages to display system performance. For example, Threebond 3000/3100 series materials (from Threebond Corporation, Cincinnati, OH) have favorable water vapor barrier properties (e.g., low water vapor permeability), low viscosity at elevated temperature for easy dispensing of the edge seal material, good wetting characteristics, and manageable curing properties. Those skilled in the art and familiar with advanced sealants will be able to identify other sealants that offer comparable performance.

The curable edge sealing material 196 is then cured using an ultraviolet irradiation device to make a moisture proof seal at the corners of the electro-optic display 100 where rods 181 and 182 meet with the ends of rod 180. As denoted by arrow 292, barrier tape 170 is then wrapped around rod 180 while keeping barrier tape 170 in intimate contact with rod 180 until the barrier tape 170 is applied to the bottom barrier layer 161 (and over the ends of barrier tape 171 and barrier tape 172). The round shape and diameter of rod 180 prevent the barrier tape 170 from creasing or being bent at a radius that could cause the barrier tape 170 to crack during or after application to the electro-optic display.

Finally, any portions of barrier tape 170 that extend beyond the edges of the top barrier layer 160 and the bottom barrier layer 161 can be trimmed off. In some embodiments, barrier tape 170 is precut to a predetermined length based on the dimensions of the electro-optic display 100, and is applied such that it does not require trimming. A substantially similar process can be used to add an edge seal at the other edge of the electro-optic display (not shown in FIG. 2C).

Figure 2D:
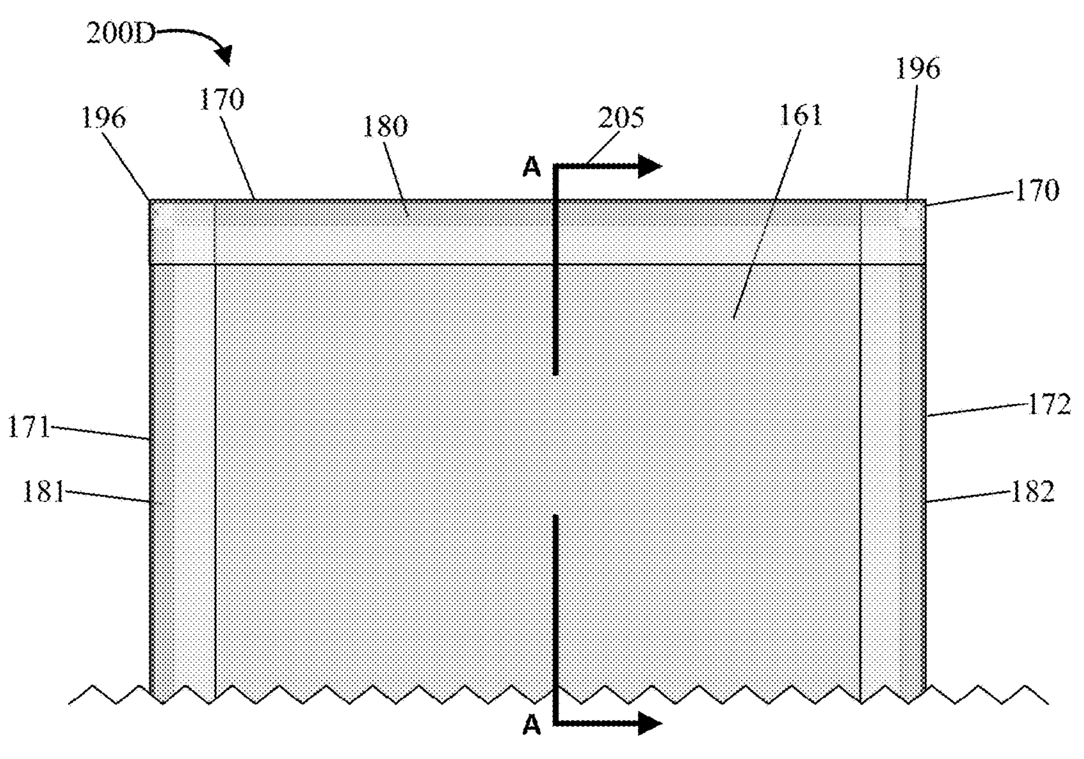

FIG. 2D is a cutaway bottom view 200D illustrating an electro-optic display (e.g., electro-optic display 100) incorporating edge seals according to the technology and techniques described herein. As discussed above, the inventive edge seal components and fabrication processes can minimize or eliminate cracking of the barrier tape material thereby advantageously preventing moisture and contaminants from penetrating into the electro-optic material and other components of the electro-optic display. Such edge seals can provide performance equivalent or superior to conventional liquid-dispensed edge seals which are more time-consuming and difficult to implement, in addition to being more difficult to scale for large production runs because the edge sealing liquid must be dispensed around the perimeter of each electro-optic display and then cured. In contrast, using the edge sealing technology and techniques described herein enables many of the components to be prepared in advance, and significantly reduces the cure time as only a small amount of curable edge sealing material is used for each electro-optic display.

Further, the edge seal technology described herein significantly reduces the width of the barrier material around the perimeter of a finished electro-optic display as compared to an electro-optic display employing a conventional pinched edge seal (e.g., FIG. 2 of aforementioned U.S. Pat. No. 7,649,674 and FIG. 4 of U.S. Patent Application Publication No. 2020/0032081) which is formed by pinching and adhering the overhanging top and bottom barrier layer materials together. Conventional pinched edge seals can add 15 mm or more of width at each edge of the electro-optic display. The outer border region or bezel portion of the housing for a display incorporating an electro-optic display produced using the edge seal technology described herein can therefore be made significantly narrower than the bezel of a display incorporating an electro-optic display with conventional pinched edge seals. Accordingly, for a display housing of a given size, a display incorporating an electro-optic display with the inventive edge seal technology described herein can have a larger viewable area than a display incorporating a conventional pinched edge seal electro-optic display. The inventive edge seal technology described herein also increases the scalability of display applications by enabling the construction of composite displays made up of several individual electro-optic displays arranged as closely as possible in a tiled configuration. For example, the reduced width of the perimeter barrier material allows individual electro-optic display sections to be positioned close enough to one another to give the composite display the appearance of a seamless unitary screen.

In an alternative embodiment, a continuous section of rod material is wrapped around the entire perimeter of the electro-optic display. The material used for the rod member is chosen such that the rod member is not deformed or damaged by the required bend radius to route the rod member around each corner of the display. Further, a continuous piece of barrier tape is used to seal the edges of the display. This embodiment advantageously eliminates manufacturing steps such as sizing and cutting each section of rod member and barrier tape individually. It also eliminates the need for a UV curable edge sealing material at each corner as the barrier tape is a continuous length of material with no voids or openings at the corners.

Figures 3, 4:
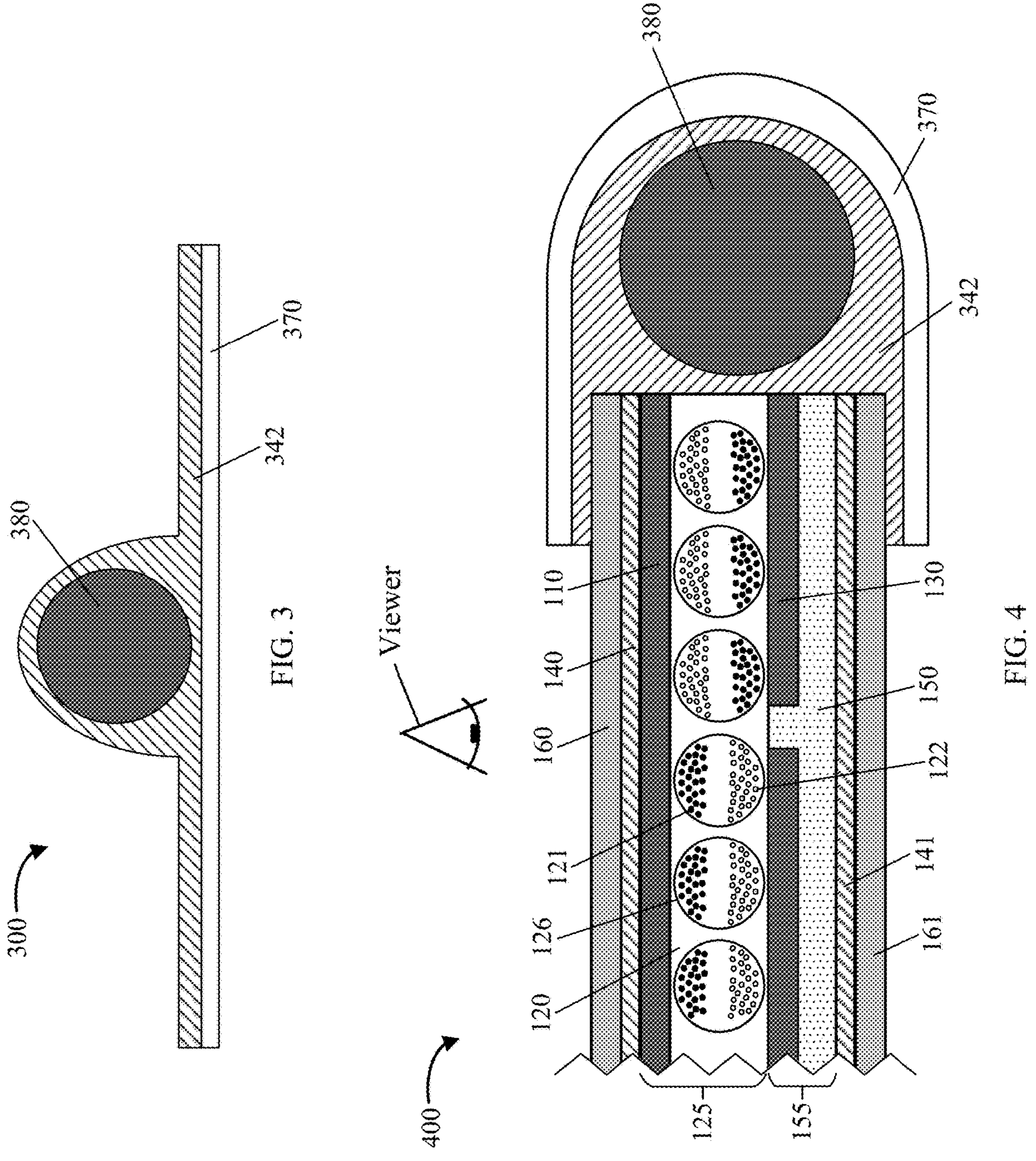
FIG. 3 is a schematic cross-section of an adhesive barrier tape with an integrated rod in accordance with the subject matter presented herein.
FIG. 4 is a cutaway view of a schematic cross-section showing an exemplary embodiment of a sealed electro-optic display incorporating an adhesive barrier tape with an integrated rod in accordance with the subject matter presented herein.

FIG. 3 is a schematic cross-section 300 of an adhesive barrier tape 370 with an integrated rod 380 in accordance with the subject matter presented herein. Barrier tape 370 can be formed from substantially similar materials to the barrier tape described above, and can include an adhesive layer 342 coating at least one side of the tape and an integrated rod 380 that extends the length of barrier tape 370. The rod 380 can be positioned substantially along the lengthwise center of barrier tape 370.

FIG. 4 is a cutaway view of a schematic cross-section showing an exemplary embodiment of a sealed electro-optic display 400 incorporating an adhesive barrier tape 370 with an integrated rod 380 in accordance with the subject matter presented herein. The barrier tape 370 can be applied to an edge of the electro-optic display such that the integrated rod 380 is substantially directly adjacent to an edge of the electro-optic display 100. The barrier tape 370 can then be folded over and trimmed to size as before, or precut to a desired length. A curable edge sealing material can be applied as described above to seal off the corners of electro-optic display 400.

The electro-optic display 400 provides all of the advantages of the electro-optic display 100 described above, and provides further advantages in that the barrier tape 370 reduces the number of manufacturing steps required to produce the electro-optic display, in particular, steps that typically must be performed manually. The speed of the manufacturing process is also greatly improved. For example, an entire sheet or roll of electro-optic display material can be coated with top and bottom barrier layers in a single operation, and individual electro-optic displays of a desired dimension can be then cut from the larger sheet. Accordingly, when using barrier tape 370 it is no longer necessary to apply the top and bottom barrier layers to the electro-optic display in a secondary operation after the electro-optic display is cut from a larger sheet, and to subsequently trim the oversized sheets of barrier layer material such that they overhang each edge of the electro-optic display by an amount substantially equal to the diameter of the rod.

In an alternative embodiment, a continuous piece of barrier tape 370 is wrapped around the entire perimeter of the electro-optic display. The material used for the rod member is chosen such that the rod member is not deformed or damaged by the required bend radius to route the rod member around each corner of the display. This embodiment advantageously eliminates manufacturing steps such as sizing and cutting each section of barrier tape individually. It also eliminates the need for a UV curable edge sealing material at each corner as the barrier tape is a continuous length of material with no voids or openings at the corners.

Some electro-optic display applications may benefit from additional useful features apart from the superior moisture barrier properties of the edge seal components described above. For example, variable transmission window films for architectural applications are often applied to the outside surface of an existing glass window in order to save significant time and money during installation. Such films are commonly exposed to extreme temperature fluctuations, moisture, and mechanical stresses due to varying weather conditions.

Variable transmission window films for architectural applications can also be encased between panes of glass in the interior of a window at the time of manufacture to better protect and insulate the film. However, the film can still be exposed to similar temperature fluctuations and the mechanical stresses experienced by the building structure such as vibration and flexing. Further, the various materials used in the variable transmission window film, the pane glass, the window frame and, other structural components typically have significantly different properties (e.g., coefficient of thermal expansion, modulus of elasticity, etc.) from one another, and can therefore physically change (e.g., expand/contract, flex, twist, etc.) at different rates in response to changing environmental conditions.

Accordingly, the edge seal technology described herein can include additional features that provide the added durability and protection needed to make such applications viable in harsher environments. For example, in some embodiments the inner surface of the edge sealing barrier tape that gets applied to the top and bottom barrier layers (e.g., top barrier layer 160 and bottom barrier layer 161) of the electro-optic display incorporates a layer of electrically insulating material.

The insulating material prevents the electrodes (e.g., top electrode 110 and bottom electrode 130) from shorting to each other and to other components within the structure or housing into which the electro-optic display 100 may be installed. Further, edge sealing barrier tape described herein can protect the different layers of electro-optic display 100 from delaminating at their edges during handling and end-use installation. This advantageously enables the electro-optic display 100 to be produced using a roll-to-roll process without requiring an additional lamination step to add a protective and/or barrier layer after cutting parts from the roll of finished display material. For example, conventional manufacturing techniques require each portion of display material cut from a roll must be laminated piece-wise, which is a time consuming process and prone to introducing defects to the display, particularly to the viewing area. In contrast, using the edge sealing barrier tape described herein, a device manufacturer can simply cut a piece of display film from a roll, apply electrical connections to the film electrodes as needed, and wrap the edges with the barrier tape in preparation for final installation in an architectural structure or product housing.

In some embodiments, the barrier tape is fabricated as a multi-layer stack of materials having different properties based on the environmental condition to which they will be exposed. In some embodiments, the barrier tape includes a barrier material (e.g., metal foil or similar material) on the surface that will be exposed to the outside environment and an insulating material (e.g. polyimide or similar material) on the surface that will be applied to the barrier layers of the electro-optic display. In some embodiments, the barrier tape is a ceramic-coated PET film. In some embodiments, the barrier tape is produced as a single multifunctional film from a material having both barrier and insulating properties.

Further, the construction of the edge sealing barrier tape described herein can be modified according to the particular application of the finished electro-optic display. In some embodiments, the barrier tape is fabricated such that a first portion of its outer surface contains a first material and a second portion of its outer surface contains a second having different properties than the first material. For example, referring to FIG. 1, electro-optic display 100 can be a variable transmission window film that will be applied to the outside surface of an existing glass window. The barrier tape 170 can be produced such that substantially half of its outer surface includes a first material and substantially half of its outer surface includes a second material having different properties than the first material. For example, the outer surface of barrier tape 170 can be apportioned lengthwise in substantially equal halves with an adhesive portion **170*a* on a first half and a barrier portion 170*b* on a second half. The adhesive portion 170*a* can include an adhesive or other bonding agent to facilitate application of the electro-optic display 100 to the window glass. The outside-facing barrier portion 170***b* can comprise a wear or weather resistant material to provide added durability to the electro-optic display 100.

In some embodiments, the electro-optic display 100 is intended to be used as a free-standing device and the entire outer surface of barrier tape 170 is wear resistant but does not include an adhesive. In some embodiments, the barrier tape 170 comprises a colorant (e.g., a dye, a pigment, or another substance used for coloring). In some embodiments, the barrier tape 170 is provided in any one of a variety of colors to enable color-matching to an architectural structure or product housing onto or into which the electro-optic display 100 is being installed.

Figure 10:
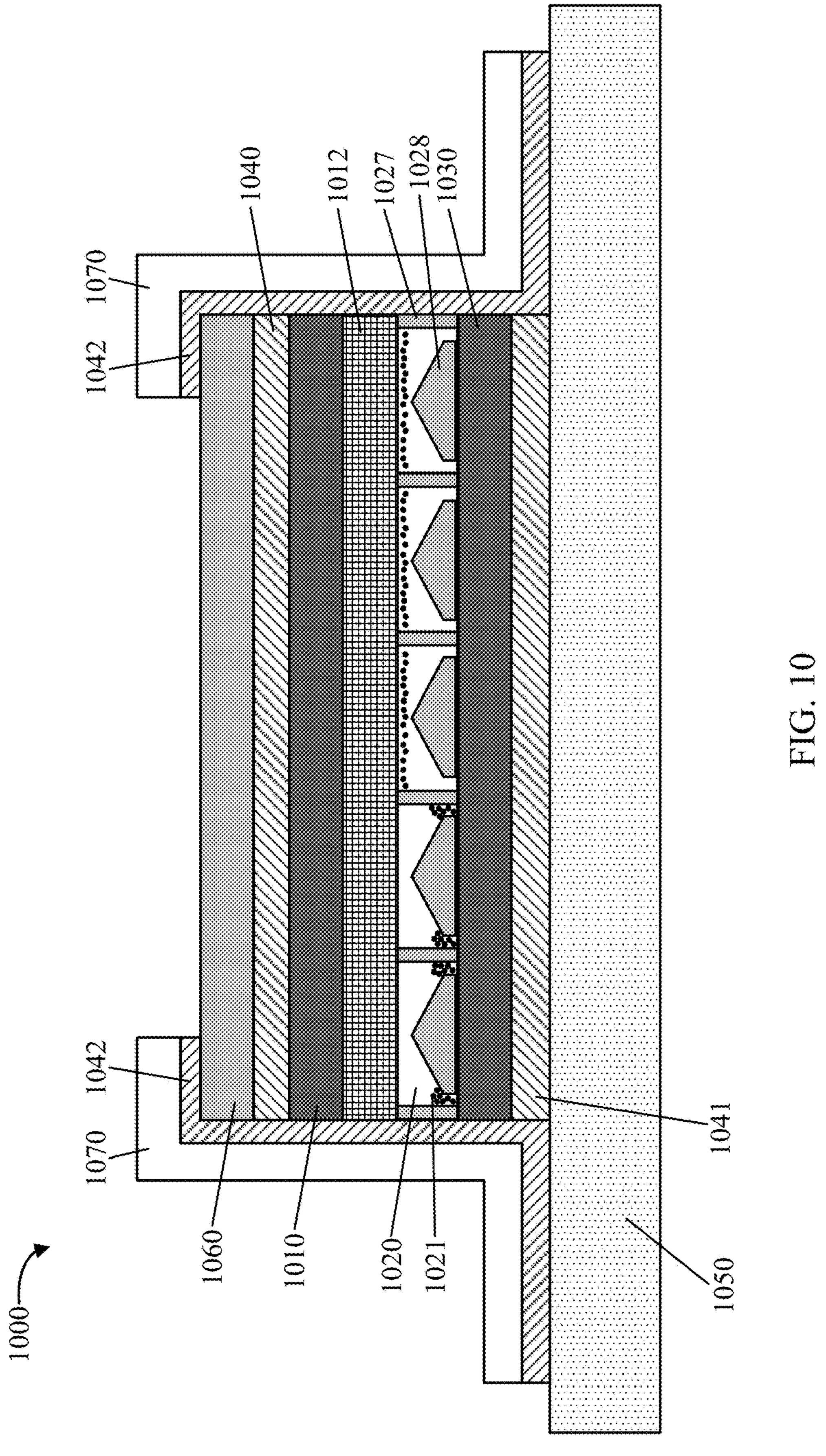
FIG. 10 is a schematic cross-section showing an exemplary embodiment of a variable transmission window including a sealed electro-optic display stack in accordance with the subject matter presented herein.

FIG. 10 is a schematic cross-section showing an exemplary embodiment of a variable transmission window 1000 including a sealed electro-optic display stack in accordance with the subject matter presented herein. Variable transmission window 1000 typically includes a top transparent electrode 1010, a layer of electrophoretic medium 1020, and a bottom transparent electrode 1030. The top transparent electrode 1010 and the bottom transparent electrode 1030 are light-transmissive electrically-conductive layers and can each comprise a contiguous planar layer of electrically-conductive material. Alternatively, one or both of the top transparent electrode 1010 and the bottom transparent electrode 1030 can comprise a plurality of separately-addressable pixel electrodes controlled with thin film transistors (TFT).

The electrophoretic medium 1020 contains a plurality of electrophoretic particles 1021. Electrophoretic particle 1021 can have different electrical charges and different optical characteristics. In some embodiments, electrophoretic particle 1021 is black and has a positive charge. In some embodiments, electrophoretic particle 1021 is white and has a negative charge. In some embodiments, the electrophoretic medium 1020 includes just a single type of electrophoretic particle, or three or more electrophoretic particles, each possibly having different optical, electro-optical, or chemical properties.

The electrophoretic medium 1020 shown in FIG. 10 is compartmentalized by the walls 1027 into a plurality of microcells. However, in some embodiments, the electrophoretic medium 1020 is compartmentalized by a plurality of microcapsules similar to the electro-optic display 100 of FIG. 1. A protrusion structure 1028 is formed in each microcell. The protrusion structure 1028 can comprise several geometric shapes. In this example, the protrusion structure 1028 is a cone on a cylinder. The protrusion structure 1028 has a protrusion base, a protrusion wall surface, a protrusion apex, and a protrusion height. The protrusion apex is the point or set of points of the protrusion structure 1028 having shorter distance from microcell opening than all other points of the protrusion structure 1028. In some embodiments, the walls 1027 and the protrusion structures 1028 are formed from polymeric materials, as discussed in the patents and publications referenced above.

In the example of the microcell of FIG. 10, the apex of the protrusion structure 1028 is the apex of the cone. The protrusion height is the distance between the protrusion base and the protrusion apex. If the protrusion structure 1028 has an apex that comprises more than one points, such as a planar surface, the protrusion height is the distance between the planar surface and the base of the protrusion base.

The microcells are sealed by a sealing layer 1012, which may be, for example, a UV cured fluoropolymer. In some embodiments, the sealing layer 1012 is a hydrophilic polymer that is incompatible with the fluid in the electrophoretic medium 1020. Examples of components used in a sealing composition for the sealing layer 1012 may include, but are not limited to, thermoplastic or thermoset and their precursor thereof. Specific examples may include materials such as monofunctional acrylates, monofunctional methacrylates, multifunctional acrylates, multifunctional methacrylates, polyvinyl alcohol, polyacrylic acid, cellulose, gelatin or the like. Additives such as a polymeric binder or thickener, photoinitiator, catalyst, vulcanizer, filler, colorant or surfactant may be added to the sealing composition to improve the physico-mechanical properties and the light-collimating film.

The sealing composition may be a water soluble polymer with water as the sealing solvent. Examples of suitable water soluble polymers or water soluble polymer precursors may include, but are not limited to, polyvinyl alcohol; polyethylene glycol, its copolymers with polypropylene glycol, and its derivatives, such as PEG-PPG-PEG, PPG-PEG, PPG-PEG-PPG; poly(vinylpyrrolidone) and its copolymers such as poly(vinylpyrrolidone)/vinyl acetate (PVP/VA); polysaccharides such as cellulose and its derivatives, poly(glucosamine), dextran, guar gum, and starch; gelatin; melamine-formaldehyde; poly(acrylic acid), its salt forms, and its copolymers; poly(methacrylic acid), its salt forms, and its copolymers; poly(maleic acid), its salt forms, and its copolymers; poly(2-dimethylaminoethyl methacrylate); poly(2-ethyl-2-oxazoline); poly(2-vinylpyridine); poly(allylamine); polyacrylamide; polyethylenimine; polymethacrylamide; poly(sodium styrene sulfonate); cationic polymer functionalized with quaternary ammonium groups, such as poly(2-methacryloxyethyltrimethylammonium bromide), poly(allylamine hydrochloride). The sealing material may also include a water dispersible polymer with water as a formulating solvent. Examples of suitable polymer water dispersions may include polyurethane water dispersion and latex water dispersion. Suitable latexes in the water dispersion include polyacrylate, polyvinyl acetate and its copolymers such as ethylene vinyl acetate, and polystyrene copolymers such as polystyrene butadiene and polystyrene/acrylate.

Variable transmission window 1000 includes a protective or barrier layer 1060 for protecting the top electrode 1010 from damage. A first adhesive layer, adhesive layer 1040, is disposed between the top electrode 1010 and the barrier layer 1060. The barrier layer 1060, together with the edge sealing components discussed in detail below, may envelop substantially the entirety of the surface of variable transmission window 1000 to prevent ingress of water and limit variations in relative humidity within the structure of the variable transmission window 1000.

Examples of additional components which may be present, for example in an adhesive composition may include, but are not limited to, acrylics, styrene-butadiene copolymers, styrene-butadiene-styrene block copolymers, styrene-isoprene-styrene block copolymers, polyvinylbutyral, cellulose acetate butyrate, polyvinylpyrrolidone, polyurethanes, polyamides, ethylene-vinylacetate copolymers, epoxides, multifunctional acrylates, vinyls, vinylethers, and their oligomers, polymers and copolymers. Adhesive layers may also contain polyurethane dispersions and water soluble polymer selected from the group consisting of polyvinyl alcohol; polyethylene glycol and its copolymers with polypropylene glycol; poly(vinylpyrolidone) and its copolymers; polysaccharides; gelatin; poly(acrylic acid), its salt forms, and its copolymers; poly(methacrylic acid), its salt forms, and its copolymers; poly(2-dimethylaminoethyl methacrylate); poly(2-ethyl-2-oxazoline); poly(2-vinylpyridine); poly (allylamine); polyacrylamide; polymethacrylamide; and a cationic polymer functionalized with quaternary ammonium groups. Adhesive layers may be post cured by, for example, heat or radiation such as UV after lamination.

In some embodiments the adhesive layers can include an integrated primer component to improve adhesion, or a separate primer layer (not shown in FIG. 10) can be used. (The structures of electrophoretic displays and the component parts, pigments, adhesives, electrode materials, etc., are described in many patents and patent applications published by E Ink Corporation, such as U.S. Pat. Nos. 6,922,276; 7,002,728; 7,072,095; 7,116,318; 7,715,088; and 7,839,564, all of which are incorporated by reference herein in their entireties.) In some embodiments, the barrier layers are fabricated to include an integral adhesive material or layer on at least one surface.

The display stack structure made up of the barrier layer 1060, adhesive layer 1040, the top transparent electrode 1010, the sealed microcells of electrophoretic medium 1020, and the bottom transparent electrode 1030 can be applied to a substrate 1050. A second adhesive layer, adhesive layer 1041, adheres the display stack to substrate 1050. In some embodiments, the display stack is laminated to the substrate 1050.

The substrate 1050 can be a material used to form the pane of a window. The substrate 1050 can be a type of glass, for example, clear float glass, tinted/colored glass, solar glass (i.e. infrared absorbing/reflecting glass), self-cleaning glass (e.g., Pilkington Activ), low-reflectivity glass (e.g., Pilkington Optiview), high-grade thin glass (e.g., Pilkington Microfloat), a high optical purity glass (e.g., Pilkington Optiwhite), or a multi-layered structure formed of multiple types of glass materials. An example of a solar glass is green glass that has a visible light transmittance of 75% (or more) and absorbs about 35% of infrared in the wavelength band 0.9 to 1.3 micron. The substrate 1050 can also be any glass, polycarbonate, acrylic or other suitable transparent sheet used to form a window pane.

Variable transmission window 1000 can also include an edge seal formed by an edge sealing material or flexible barrier tape 1070 which extends along the outer perimeter of variable transmission window 1000. The edge seal serves to prevent the ingress of moisture and other contaminants around the outer edges of the variable transmission window 1000. As shown in FIG. 10, a third adhesive layer, adhesive layer 1042, adheres a first horizontal section of flexible barrier tape 1070 to a portion of the top of barrier layer 1060, a vertical section of flexible barrier tape 1070 to the outer vertical edges of the layers making up the display stack, and a second horizontal section of flexible barrier tape 1070 to the surface of the substrate 1050. Although drawn as distinct layers in FIG. 10, in some embodiments barrier tape 1070 comprises an outer layer having good barrier characteristics and an integrated inner adhesive layer, which is used to secure the barrier tape 1070 to the layers making up the display stack and to the substrate 1050.

In operation, when an a electric field is applied between the top transparent electrode 1010 and the bottom transparent electrode 1030 via a first voltage waveform, the electrically-charged electrophoretic particles 1021 move toward the bottom transparent electrode 1030 and are directed by the slope of the cone portion of the protrusion structure 1028 to the channels on either side of the protrusion structure 1028. The positioning of the electrophoretic particles 1021 in the channels results in an open or transparent state of the variable transmission window 1000. The two leftmost microcells shown in FIG. 10 are illustrative examples of the position of the electrophoretic particles 1021 when the variable transmission window 1000 is in the open state.

In order to make a transition from the open state to an opaque or closed state, application of an electric field between the top transparent electrode 1010 and the bottom transparent electrode 1030 via a second voltage waveform causes a movement of the electrically-charged electrophoretic particles 1021 towards the top transparent electrode 1010 with a second velocity. The three rightmost microcells shown in FIG. 10 are illustrative examples of the position of the electrophoretic particles 1021 when the variable transmission window 1000 is in the closed or opaque state. Showing the two leftmost microcells in FIG. 10 in the open state while showing the three rightmost microcells simultaneously being in the closed state is merely illustrative of the pigment shuttering mechanism. For a variable transmission window 1000 including a single top transparent electrode 1010 and a single bottom transparent electrode 1030, all of the microcells would typically be in the same state.

Note that it is also necessary to impart some lateral velocity component when moving the electrophoretic particles 1021. If not, they will simply move up, moving in the vertical direction but not in the lateral directions from their starting positions in the channel. In this scenario (no lateral direction), the closed state will not be effectively formed, because the closed state will have relatively high light transmittance. Induced-charge electro-osmosis ("ICEO") can be used to provide such a motion. For example, fluid flows induced by electrolyte motion around the electrophoretic particles 1021 having a higher percentage of light transmission than in the closed optical state result in fluid being drawn towards the electrophoretic particles 1021 at the poles and expelled at the equator. Since other electrophoretic particles 1021 may be entrained in the fluid, and since the electrophoretic particles 1021 may have different sizes and thus may be experiencing different magnitudes of ICEO velocity, at appropriately high applied fields (typically >1V/micrometer) and low frequencies (typically in the range of 10-1000 Hz AC), chaotic motion of the particles can be induced, resulting in scrambling of their positions even if they are originally concentrated in one area.

A variable transmission window formed with the structure of variable transmission window 1000 can be less expensive to manufacture than a display stack including a barrier layer on the top and bottom. For example, such a variable transmission window can be produced using fewer layers as no bottom barrier layer and a corresponding adhesive layer are needed, and a layer of lamination adhesive is not needed between the sealing layer and the top transparent electrode. This also reduces the number of steps needed to manufacture the display stack. Further, omission of these layers makes such a variable transmission window thinner overall, and increases its light transmittance. In addition, the product quality and manufacturing yield of variable transmission window 1000 is higher as the barrier layer 1060 can be applied to display stack in a roll-to-roll manufacturing process as opposed to being applied in a secondary lamination process after the display stack is adhered to the substrate 1050.

As discussed above, conventional dispensed thermosetting edge seals can be time consuming to apply and cure to the perimeter of an electro-optic display. The edge sealing barrier tape described above improves conventional dispensed edge seals, in part, by eliminating the use of a dispensed edge sealing liquid from all but the corners of the electro-optic display where the barrier tape segments on adjacent display edges meet.

FIGS. 5A to 5F illustrate additional aspects of the inventive edge seal technology described herein and related manufacturing techniques that completely eliminate the use of a dispensed thermosetting barrier material requiring curing. In particular, a barrier seal is described that can be formed from a flexible barrier material and positioned at each corner of an electro-optic display to seal the corners without using a curable edge sealing material.

Figure 5A:
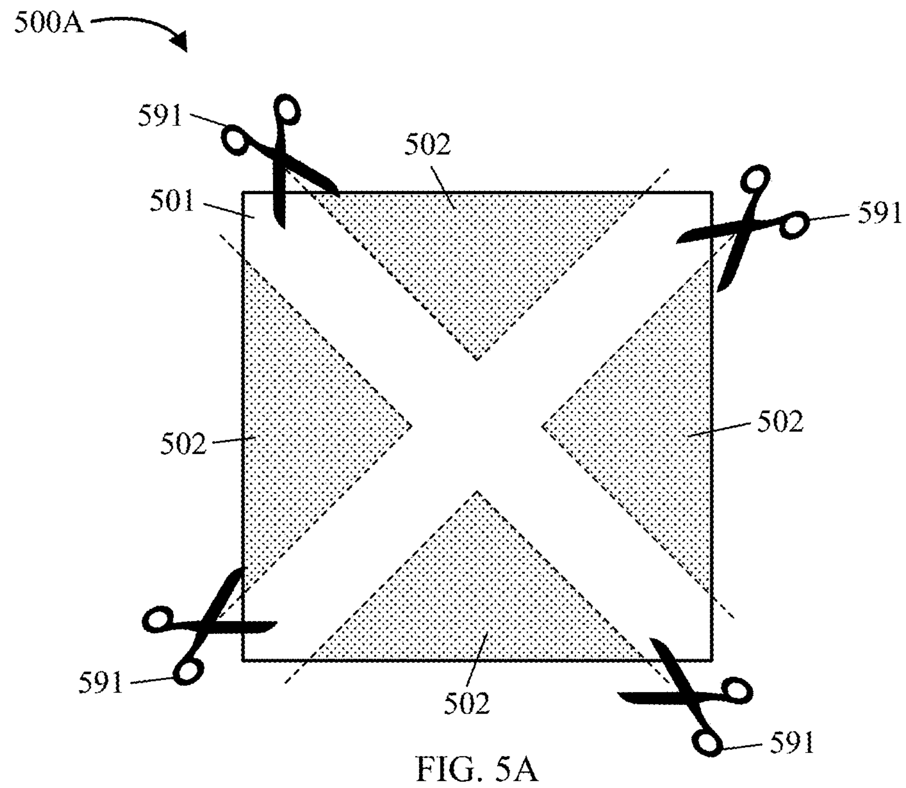
FIGS. 5A to 5F are diagrams illustrating steps of a method for manufacturing a barrier corner seal for an electro-optic display in accordance with the subject matter presented herein.

FIG. 5A is a diagram 500*a* illustrating steps of a method for manufacturing a corner barrier seal 501 for an electro-optic display in accordance with the subject matter presented herein. FIG. 5A shows a top view of corner barrier seal 501 a substantially square-shaped sheet 501 of barrier material. Corner barrier seal 501 can be trimmed (denoted by trim 591 and dashed lines in FIG. 5A) to remove sections 502, resulting in an X-shaped piece of barrier material.

In some embodiments, corner barrier seal 501 is a metal foil formed from a ductile thin sheet metal such as annealed aluminum or tin. In some embodiments, corner barrier seal 501 is coated with, or laminated to, a plastic film to render it non-conductive and also protect the metal from mechanical damage. In some embodiments, corner barrier seal 501 is formed from a similar material as the barrier tapes or barrier layers described above.

In some embodiments, corner barrier seal 501 is formed from a substantially square-shaped material with sides each having a length of between about 5 mm to about 50 mm. In some embodiments, corner barrier seal 501 is formed from a ceramic coated PET having a thickness of net for example, a thickness of between about 12 μm to about 127 μm. In some embodiments, corner barrier seal 501 is formed from an aluminum foil-like material having a thickness of between about 6 μm to 50 μm, although a thicker material can be used in conjunction with a metal forming tool capable of working with thicker metal materials.

Corner barrier seal 501 can be manually trimmed by hand or via a mechanized process such as automated die or laser cutting. In some embodiments, a first cutting process is used to cut squares of barrier material from a roll or larger sheet of material, and a second, different cutting process is used to remove sections 502 from corner barrier seal 501.

Figure 5B:
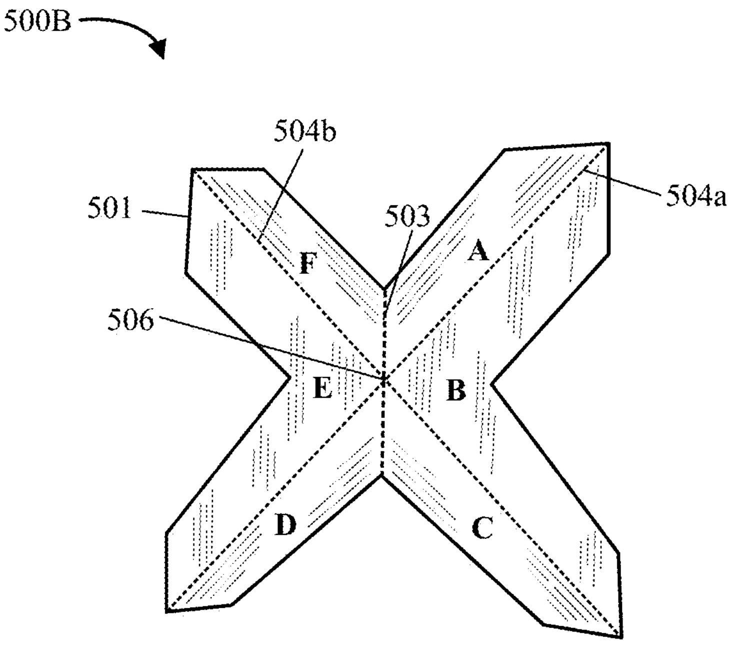

FIG. 5B is a diagram 500*b* illustrating additional steps of a method for manufacturing a corner barrier seal 501 for an electro-optic display in accordance with the subject matter presented herein. FIG. 5B shows a top view of now X-shaped corner barrier seal 501 with sections 502 removed. Corner barrier seal 501 is folded or creased at each of folds 503, 504*a*, and 504*b* (fold 504*a* and fold 504*b* collectively referred to as "folds 504") and then unfolded to its original shape. The folds 503 and 504 divide the top surface of corner barrier seal 501 into individual faces A-F meeting at intersection 506.

Figure 5C:
Figure 5C:
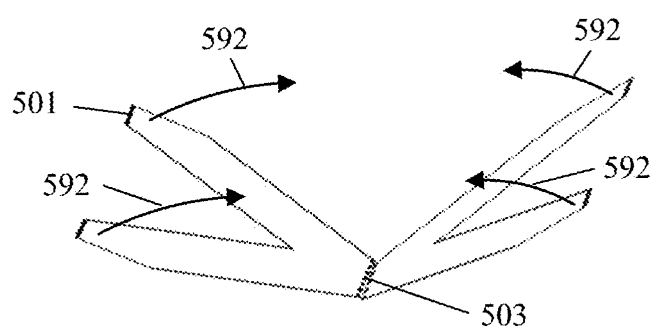

FIG. 5C is a diagram 500*c* showing corner barrier seal 501 being creased at fold 503. As indicated by arrows 592, fold 503 is a so-called "valley fold" made such that the sides of corner barrier seal 501 are folded upward at fold 503 until the top surfaces of faces A, B, and C meet with the top surfaces of faces D, E, and F. After making fold 503, corner barrier seal 501 is unfolded to its original shape.

Figure 5D:
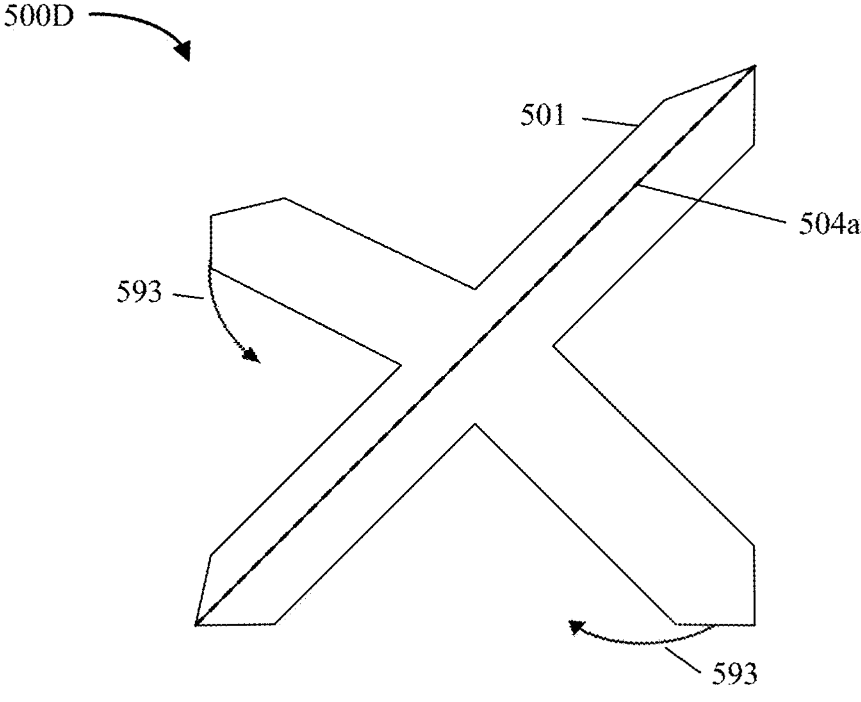

FIG. 5D is a diagram 500*d* showing corner barrier seal 501 being creased at fold 504*a*. As indicated by arrows 593, fold 504*a* is a so-called "mountain fold" made such that corner barrier seal 501 is folded at fold 504*b* until the bottom surfaces of faces B, C, and D meet with the bottom surfaces of faces A, E, and F. After making fold 504*a*, corner barrier seal 501 is unfolded to its original shape. Fold 504*b* is then made (not shown in FIG. 5D) such that corner barrier seal 501 is folded at fold 504*b* until the bottom surfaces of faces A, B, and F meet with the bottom surfaces of faces D, D, and E. After making fold 504*b*, corner barrier seal 501 is again unfolded to its original shape.

Although the folds have been described herein in a particular order, one of skill in the art will appreciate that folds 503, 504*a*, and 504*b* can be made in any order without altering the final configuration of corner barrier seal 501.

Corner barrier seal 501 can be manually folded by hand or via a mechanized process such as a press die. In some embodiments, a combination of mechanized folding and folding by hand is used to make folds 503, 504*a*, and 504*b*.

Figure 5E:
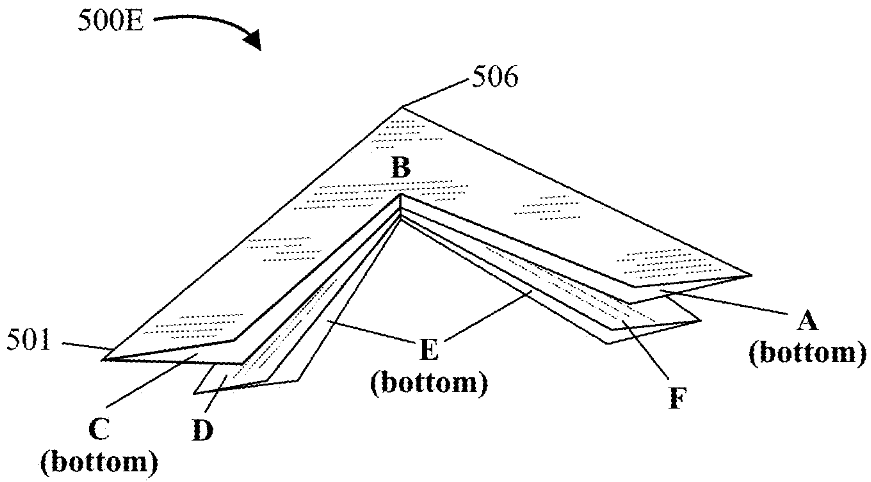

FIG. 5E is an isometric diagram 500*e* illustrating a corner barrier seal 501 for an electro-optic display after carrying out additional steps of a method for manufacturing in accordance with the subject matter presented herein. As indicated above, corner barrier seal 501 is unfolded to its original shape after each of folds 503, 504*a*, and 504*b* is made. To arrive at the configuration of corner barrier seal 501 shown in FIG. 5E, folds 503, 504*a*, and 504*b* are then simultaneously re-folded along the same fold lines to form two corner pockets: a first corner pocket formed between surfaces A, B, and C, and a second corner pocket formed between surfaces D, E, and F.

Once the corner barrier seal 501 has been prepared as described above, it can be applied to the corner of an electro-optic display. In one embodiment, a front plane laminate is first laminated to a backplane, and the resulting structure is cut to the desired display size. A corner barrier seal 501 can then be placed at each corner of the display. In some embodiments, each corner of the display laminate is tucked into one of the two corner pockets of the corner barrier seal 501. In some embodiments, the inner faces of the corner barrier seal 501 (FIG. 5E, faces A, C, D, and F) can be tucked or wedged between the front plane laminate and the backplane such that the corner of the front plane laminate is received in the corner pocket formed between surfaces A, B, and C, and the corner of the backplane is received between the corner pocket formed between surfaces D, E, and F.

Figure 5F:
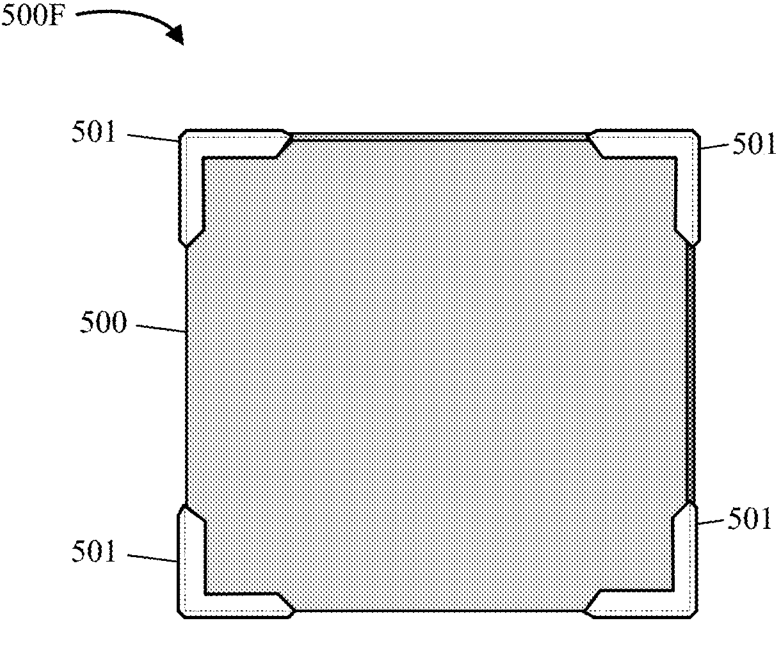

FIG. 5F is an isometric view 500F of an electro-optic display 500 with a corner barrier seal 501 positioned at each corner. In some embodiments, the corner barrier seals 501 do not require any adhesive to permanently stay in place because they are covered by the top and bottom barrier layers that are subsequently laminated to the top and bottom surfaces of the electro-optic display 500. A taped edge seal such as the flexible barrier tapes described above can then applied to each edge of the electro-optic display 500. Alternatively, corner barrier seals 501 still allows conventional pinched edge seals to be used, e.g., by sizing the top and bottom barrier layers such that they extend beyond the edges of the display and corner barrier seals 501 as required.

In some embodiments, the corner barrier seal 501 is produced with an adhesive on the bottom side of the barrier material such that the inside surfaces of the corner pockets can be adhered to a corner of an electro-optic display. This enables the corner barrier seals 501 to be applied to the corners of the electro-optic display after lamination of the top and bottom barrier layers, and a taped edge seal such as the flexible barrier tapes described above can then be used to complete the edge sealing process. This configuration can be advantageous for electro-optic displays using ITO for the top and bottom electrodes, which is common for architectural applications. For example, the top and bottom barrier layers can be laminated roll-to-roll onto the electro-optic display, thereby minimizing the per-unit lamination steps.

Corner barrier seals 501 with adhesive effectively seal the corners of the top and bottom barrier layer surfaces without a UV curable resin, and the flexible barrier tapes adhere to all surfaces of the corner barrier seals 501 plus any exposed top and bottom barrier layer material to form a comprehensive edge seal around the entirety of the electro-optic display.

Accordingly, the corner barrier seal 501 described in connection with FIGS. 5A to 5F provides several advantages over conventional corner seal components and sealing processes. For example, the corner barrier seal 501 enables a superior moisture barrier seal to be formed at all points around the perimeter of an electro-optic display and reduces the required width of the barrier material at the edges of a finished electro-optic display, thereby leading to an increase in the active and viewing areas of the electro-optic display as compared to an electro-optic display employing a conventional pinched edge seal. In addition, corner barrier seals 501 fabricated from ductile sheet metal such as annealed aluminum or tin can be made thinner yet more mechanically robust than the sputtered oxide type barrier films that are commonly used for conventional edge seals.

Incorporating corner barrier seal 501 into an edge sealing process for an electro-optic display also reduces the variety of materials and equipment needed for a manufacturing process. For example, using corner barrier seal 501 eliminates the need for materials and equipment related to dispensing a thermosetting barrier material at the corners of a display, and likewise eliminates the need for a UV curing system. Corner edge seal 501 is also useful when the display is being constructed at the location of installation (i.e., in the field) and it is not possible to, e.g., cut an edge bead, wrap, and cure the edge as described above with respect to FIGS. 1-4.

Using the corner barrier seal 501 disclosed herein can also speed up the time of manufacturing. For example, the corner barrier seal 501 can be formed separately from, and in advance of, the other components of the electro-optic display, and can even be a piece part that is sourced from a third party. The corner barrier seal 501 can therefore be a stocked part that is maintained in large quantities in the inventory of a manufacturing operation and drawn from as needed during display production. Further, the corner barrier seal 501 enables the electro-optic display assembly operation to scale more readily as the manufacturing process is not bottlenecked by the use of a specialized piece of equipment such as a UV curing station, which may be in high demand and short supply on a manufacturing floor. This allows any number of assembly technicians to work in parallel applying corner barrier seals 501 to in-process electro-optic displays on a manufacturing floor.

Finally, similar to the barrier tape described above, the corner barrier seal 501 can be provided in any one of a variety of colors to make the corner pieces less visually obtrusive. For example, a corner barrier seal fabricated from metal foil can have a colored film or paint applied to one surface in order to more closely match the color of a product housing or architectural structure into which the electro-optic display is installed.

In some embodiments, sections 502 are not removed from corner barrier seal 501 as described above in connection with FIG. 5A. In this embodiment, the finished corner barrier seal 501 covers more of the active area of the display, but advantageously enables barrier seal 501 to be fabricated from a simplified and easier-to-form shape such as a square.

Other types of conventional edge seals can be formed by pinch-sealing the top barrier layer to the surface of the backplane substrate. For example, to form the edge seals incorporated in FIG. 3 of U.S. Pat. No. 7,649,674, summarized above, peripheral portions of a barrier sheet which extend or "overhang" the outer edges of the display laminate are "pinched" down over the other layers of the display and sealed to the peripheral portion of the backplane.

Figure 6:
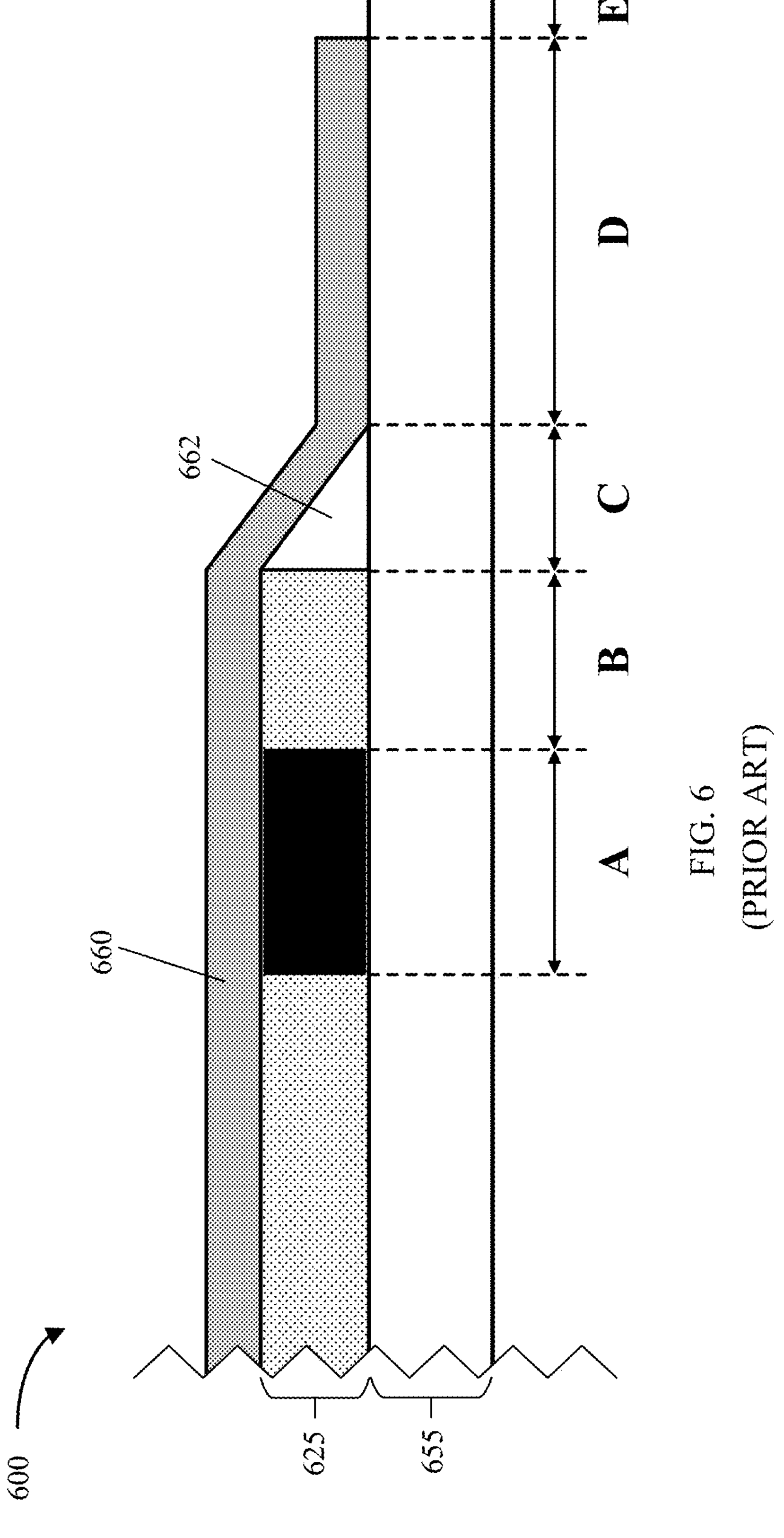
FIG. 6 is a cutaway side view of a schematic cross-section showing a conventional pinched edge seal applied to an electro-optic display.

FIG. 6 is a cutaway side view 600 of a schematic cross-section showing a conventional pinched edge seal applied to an electro-optic display. In FIG. 6, FPL 625 has been laminated to backplane 655, and an overhanging portion of top barrier layer 660 is adhered to the surface of backplane 655 to form a pinched edge seal. Dimensions A-F identify the dimensions of certain areas of the electro-optic display relevant to the pinched edge seal.

Dimension A refers to a portion of the electro-optic material that is typically set to black and left unchanged during operation to present a sharp black border around the perimeter of the display just within the viewing area (e.g., directly adjacent to, or overlapping with, the interior edges of the display bezel).

Dimension B denotes the width of a border portion of the FPL that is left unused or undriven (e.g., a voltage is not applied to change the optical state of the electro-optic medium in the area of dimension B) during operation of the electro-optic display. One reason this area is left unused is to account for any damage the structures near the edges of the FPL may have sustained when being cut from a larger sheet of material, and/or any imperfections in the FPL at the edges of the larger sheet. For example, microcells within the electro-optic medium can be severed or incomplete at the edges, as can the walls surrounding microcapsules. The combination of the areas denoted by dimensions A and B can be referred to as the inactive area of the FPL since that area cannot be used to actively display images.

An air gap 662 is typically created between top barrier layer 660 and the surface of the backplane 655 when the pinched edge seal is being applied. Dimension C identifies the width of air gap 662 at the surface of backplane 655. Dimension D denotes the width of the portion of the top barrier layer 660 that is adhered to the surface of the backplane 655. In some embodiments, a pressure sensitive adhesive is used to adhere the top barrier layer 660 to the surface of the backplane 655. Finally, dimension E denotes the width of the area at the surface of backplane 655 between the end of top barrier layer 660 and the outer edge of backplane 655.

Electro-optic displays incorporating these pinched edge seals typically have adequate moisture diffusion protection at the surface of the display, but relatively weak moisture diffusion protection at the edges. As noted above in the discussion of conventional pinched edge seals, the regions where the pinched portions of the barrier sheet are adhered to the surface of the backplane can be moisture diffusion pathways at the edges of an electro-optic display. It has been observed that the pressure sensitive adhesive used to adhere the top barrier layer 660 to the surface of the backplane 655 can be the primary moisture diffusion pathway along the edges of an electro-optic display.

Measures to reduce or mitigate the effects of edge moisture diffusion include increasing dimension A and/or dimension B to increase the width of the inactive area, and/or increasing the width of dimension D. These measures can effectively increase the distance and narrow the path any moisture must travel in or out of the electro-optic display before it can negatively impact the performance of the regions of the electro-optic display that are actively being used to display images. The air in air gap 662 also provides a measure of protection against moisture diffusion.

While these measures can enhance an electro-optic display's level of protection against moisture diffusion at its edges, increasing the width of any of the dimensions described above commonly conflicts with design goals to reduce the width of the bezel covering the portions of the display denoted by dimensions A-E, and/or to reduce the overall dimensions of the display housing.

The inventive pinched edge seal described below includes features that address the deficiencies of conventional pinched edge seals. In particular, a pinched edge seal and a corresponding process for its production are described which include a low WVTR UV-curable resin filling the area in which an air gap (e.g., air gap 662) would otherwise be created during formation of a conventional pinched edge seal.

FIGS. 7A to 7E are schematic cross-sectional views 700A through 700E illustrating steps of a method for manufacturing an electro-optic display with an enhanced pinched edge seal in accordance with the subject matter presented herein.

Figures 7A, 7B, 7C, 7D, 7E:
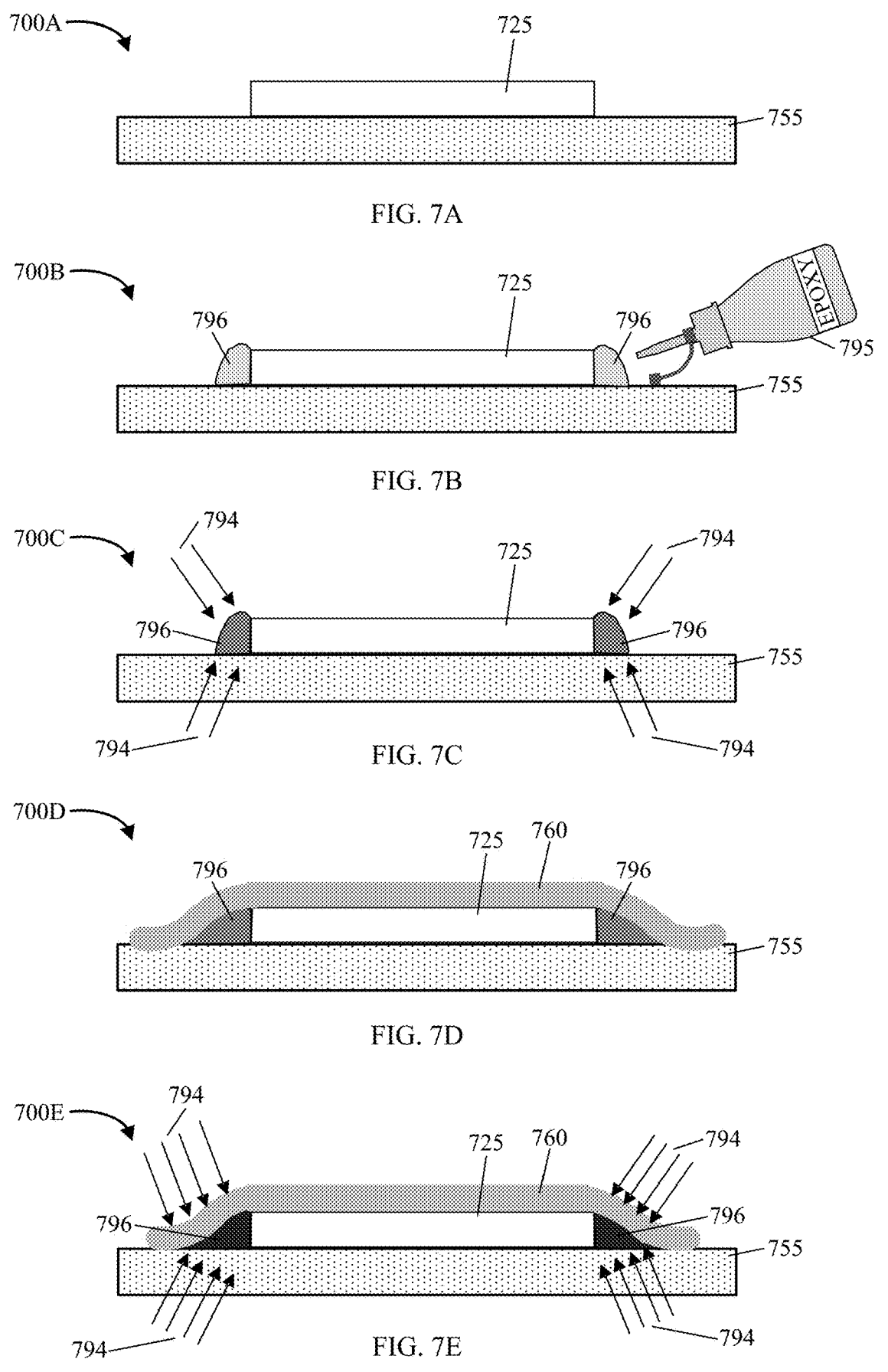

FIG. 7A is a schematic cross-sectional view 700A illustrating steps of a method for manufacturing an electro-optic display with an enhanced pinched edge seal. In FIG. 7A, FPL 725 has been laminated to the surface of a backplane 755 comprising a substantially transparent substrate and electrodes. However, one of skill in the art will appreciate that an electro-optic display incorporating a backplane 755 formed of opaque materials is within the scope of this disclosure.

FIG. 7B is a schematic cross-sectional view 700B illustrating steps of a method for manufacturing an electro-optic display with an enhanced pinched edge seal. In FIG. 7B, a dispenser 795 can be used to apply edge sealing material 796 around the perimeter of FPL 725. In some embodiments, dispenser 795 is a volumetric fluid dispensing system that can regulate the pressure and speed at which edge sealing material 796 is dispensed to apply a consistent volume of edge sealing material 796 around FPL 725.

In some embodiments, edge sealing material 796 is a material having a WVTR between less than about 0.0001 $g/m^2$/day at 60° C. and 90% relative humidity. In some embodiments, edge sealing material 796 is a material having a WVTR between about 0.0001 and about 0.01 $g/m^2$/day at 60° C. and between 90-100% relative humidity. In some embodiments, the edge sealing material 796 is a material having a WVTR between about 0.01 and about 2 $g/m^2$/day at 60° C. and 90% relative humidity. It has been found that an edge sealing material 796 having a WVTR between 2-3 $g/m^2$/day at 60° C. and 90% relative humidity (e.g., UV500 by HumiSeal, UV A80 by Cemedine Co., Ltd.), can be effective as a moisture barrier in some embodiments.

FIG. 7C is a schematic cross-sectional view 700C illustrating steps of a method for manufacturing an electro-optic display with an enhanced pinched edge seal. In FIG. 7C, an ultraviolet irradiation device or other curing system is used to partially cure (denoted by arrows 794) the edge sealing material 796, such that it is no longer free flowing but remains flexible and pliable. In some embodiments, the edge sealing material 796 is cured for about 25 seconds. In some embodiments, the edge sealing material 796 is cured for between about 15 to 40 seconds. Although FIG. 7C shows curing being performed from both the top and the bottom of the edge sealing material 796, curing of the edge sealing material 796 can be performed from the top and/or the bottom, provided the backplane 755 is formed from UV-transparent materials.

FIG. 7D is a schematic cross-sectional view 700D illustrating steps of a method for manufacturing an electro-optic display with an enhanced pinched edge seal. In FIG. 7D, the top barrier layer 760 is laminated over FPL 725 and the partially-cured edge sealing material 796. The malleable edge sealing material 796 flows enough to fill the space that would normally become an air gap (e.g., FIG. 6, air gap 662).

FIG. 7E is a schematic cross-sectional view 700E illustrating steps of a method for manufacturing an electro-optic display with an enhanced pinched edge seal. In FIG. 7E, an ultraviolet irradiation device or other curing system is used to fully cure (denoted by arrows 794) the edge sealing material 796. In some embodiments, the edge sealing material 796 is cured for greater than 60 seconds. The pinched portions of the barrier layer 760 are also adhered to the surface of the backplane 755. Although FIG. 7E shows curing being performed from both the top and the bottom of the edge sealing material 796, curing of the edge sealing material 796 can be performed from the top and/or the bottom, provided the top barrier layer 760 and the backplane 755 are formed from UV-transparent materials.

The top barrier layer 760 shown in FIGS. 7D and 7E is depicted as a continuous layer of material. However, it is noted that a process substantially similar to the process described in connection with FIGS. 7A-7E can be used for creating an enhanced pinched edge seal using a barrier tape that is applied around the perimeter of a display stack after it has been laminated to a substrate. For example, this process could be used for forming an enhanced pinched edge seal for the variable transmission window 1000 described in connection with FIG. 10.

Figure 8:
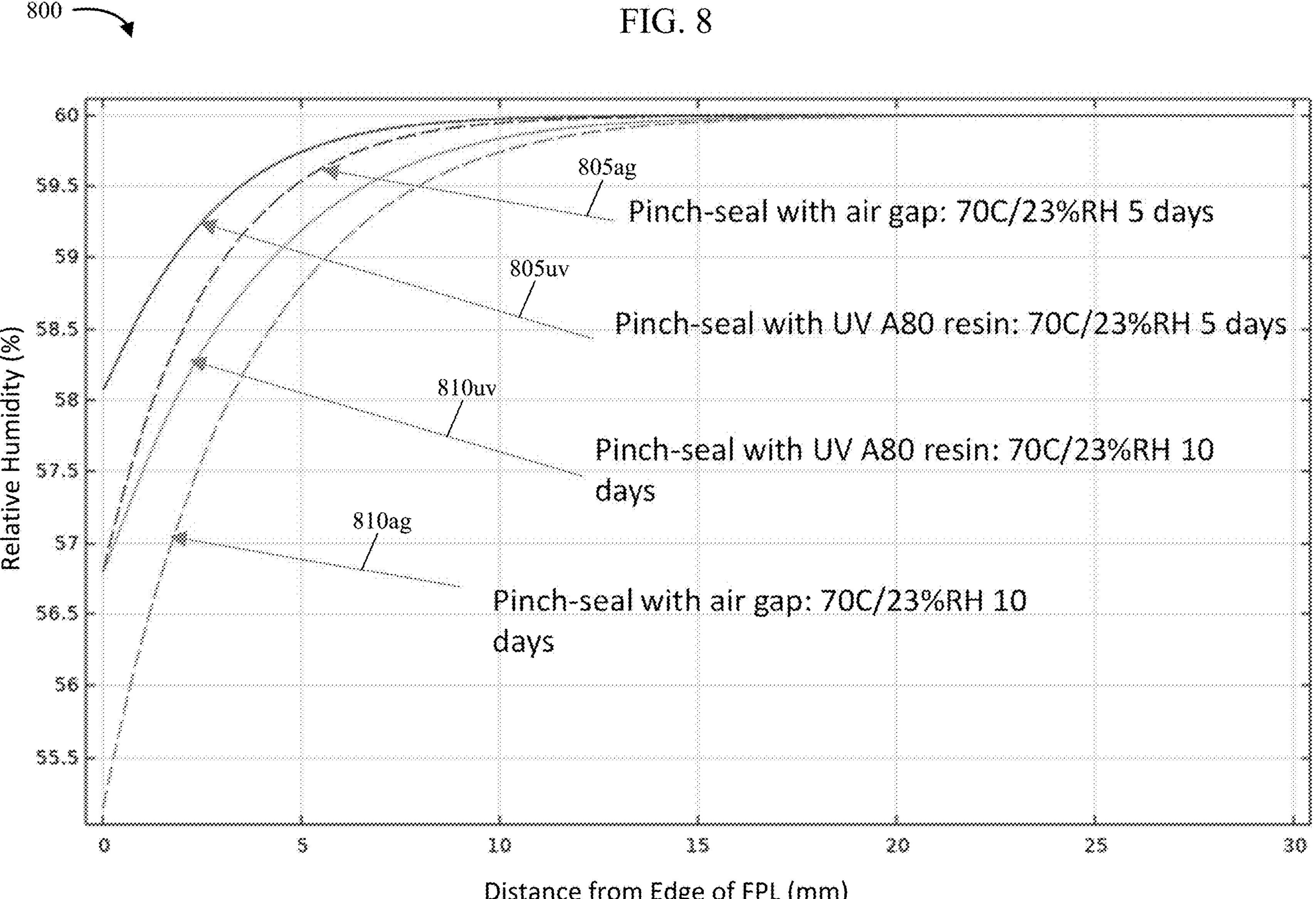
FIG. 8 shows a graph illustrating four plots of the relative humidity within an electrophoretic medium as a function of the distance from the edge of the FPL.
Figure 9:
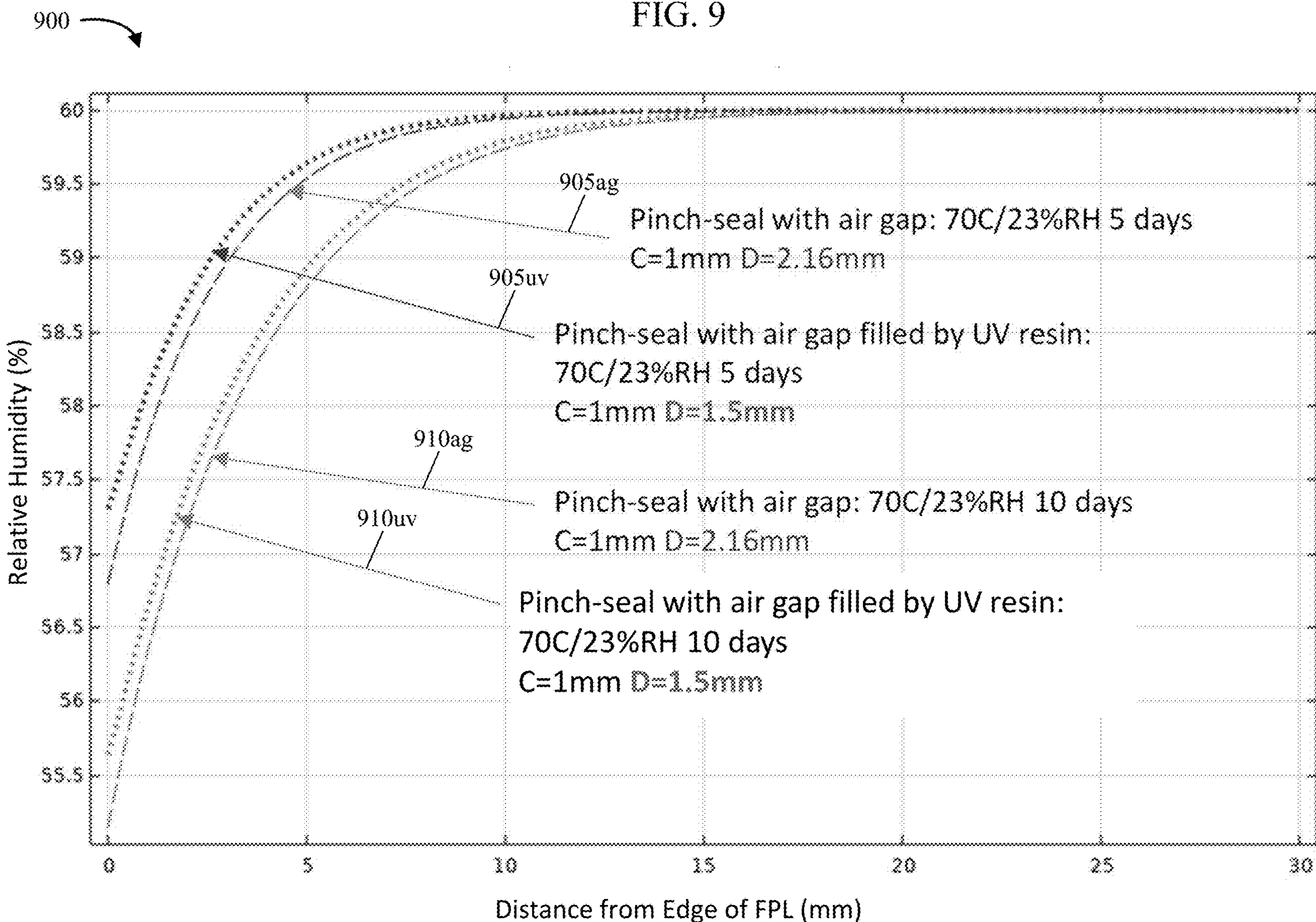
FIG. 9 shows a graph illustrating four plots of the relative humidity within an electrophoretic medium as a function of the distance from the edge of the FPL.

Incorporating the enhanced pinched edge seals described herein reduces the effects of edge moisture diffusion and improves the overall moisture protection of the electro-optic display. FIGS. 8 and 9 are graphs illustrating the results of simulations run using verified COMSOL moisture transport models for electro-optic displays incorporating conventional and enhanced pinched edge seals.

FIG. 8 shows a graph 800 illustrating four plots of the relative humidity within an electrophoretic medium as a function of distance from the edge of the FPL. Line plot 805*ag* plots the simulated edge moisture profile of an electro-optic display incorporating a conventional pinched edge seal with an air gap operated for 5 days in an environment with an ambient temperature of 70° C. and relative humidity of 23%. Line plot 805*uv* plots the simulated edge moisture profile of an electro-optic display incorporating an enhanced pinched edge seal for the same time period under the same environmental conditions. Line plot 810*ag* plots the simulated edge moisture profile of an electro-optic display incorporating a conventional pinched edge seal with an air gap operated for 10 days in an environment with an ambient temperature of 70° C. and relative humidity of 23%. Line plot 810*uv* plots the simulated edge moisture profile of an electro-optic display incorporating an enhanced pinched edge seal for the same time period under the same conditions.

As shown in FIG. 8, the enhanced pinched edge seal outperforms the conventional edge seal for both the 5- and 10-day periods, and reduces the drop in relative humidity experienced by the FPL near its edges. This results in more consistent electro-optic performance across the entire surface of the display. It also increases the durability of the displays, especially when the displays are subjected to harsh conditions, such as being outdoors and subject to large temperature swings (e.g., displays used for bus stop time tables).

FIG. 9 shows a graph 900 illustrating four plots of the relative humidity within an electrophoretic medium as a function of distance from the edge of the FPL. Line plot 905*ag* plots the simulated edge moisture profile of an electro-optic display incorporating a conventional pinched edge seal with an air gap operated for 5 days in an environment with an ambient temperature of 70° C. and relative humidity of 23%. For line plot 905*ag*, dimension C (FIG. 6) is 1 mm and dimension D (FIG. 6) is 2.16 mm. Line plot 905*uv* plots the simulated edge moisture profile of an electro-optic display incorporating an enhanced pinched edge seal for the same time period under the same environmental conditions. For line plot 905*uv*, dimension C (FIG. 6) is also 1 mm, but dimension D (FIG. 6) is reduced to 1.5 mm.

Similarly, line plot 910*ag* plots the simulated edge moisture profile of an electro-optic display incorporating a conventional pinched edge seal with an air gap operated for 10 days in an environment with an ambient temperature of 70° C. and relative humidity of 23%. For line plot 910*ag*, dimension C (FIG. 6) is 1 mm and dimension D (FIG. 6) is 2.16 mm. Line plot 910*uv* plots the simulated edge moisture profile of an electro-optic display incorporating an enhanced pinched edge seal for the same time period under the same environmental conditions. For line plot 910*uv*, dimension C (FIG. 6) is also 1 mm, but dimension D (FIG. 6) is reduced to 1.5 mm.

The plots in FIG. 9 illustrate that the enhanced pinched edge seal design provides improved edge moisture diffusion performance over the conventional air-gapped edge seal design, even when dimension D is reduced. The outer border region or bezel portion of the housing for a display incorporating an electro-optic display produced using the enhanced pinched edge seal technology described herein can therefore be made significantly narrower than the bezel of a display incorporating an electro-optic display with conventional pinched edge seals. Accordingly, for a display housing of a given size, a display incorporating an electro-optic display with the enhanced pinched edge seal technology described herein can have a larger viewable area or a smaller display housing than a display incorporating a conventional pinched edge seal electro-optic display.

The enhanced pinched edge seal described herein includes features that offer enhanced protection against moisture diffusion at the display edges while maintaining or reducing the dimensions of inactive and unused portions of the display at the edges. For example, the cured edge sealing material 796 of the enhanced pinched edge seal forms a superior moisture barrier as compared to the air present in a conventional pinched edge seal, and therefore allows the dimensions of the inactive and/or unused edge portions of the display to be reduced. Further, the partial curing step of the related inventive process ensures the UV-curable edge sealing material 796 remains pliable prior to applying the top barrier layer 760 to the FPL 725 without being so viscous that it seeps above or between layers of FPL 725. This step also ensures the edge sealing material 796 does not dry so quickly as to form a problematic hard lump of UV resin taller than FPL 725, or shrink to leave an air gap post-curing. The partially-cured edge sealing material 796 is therefore able to conform to and fill the space that would normally become an air gap underneath the pinched edge seal.

The electrode arrangements in the various types of displays of the present invention can be of any of the types described in the aforementioned E Ink and MIT patents and applications. Thus, for example, the displays may be of the direct drive type, in which the backplane is provided with a plurality of electrodes, each of which is provided with a separate connector by means of a controller that can control the voltage applied to the specific electrode. In such a direct drive display, a single continuous front electrode is usually provided covering the whole display, although other front electrode arrangements are possible. Depending upon the type of electro-optic material used, it may be possible to use a passive matrix drive arrangement in which (typically) the backplane carries a plurality of elongate parallel electrodes ("column electrodes"), while on the opposed side of the electro-optic material there is provided a plurality of elongate parallel electrodes ("row electrodes") running at right angles to the column electrodes, the overlap between one specific column electrode and one specific row electrode defining one pixel of the display. The present displays may also be of the active matrix type, typically with a single continuous front electrode covering the whole display and a matrix of pixel electrodes on the backplane, each pixel electrode defining one pixel of the display and having an associated transistor or other non-linear element, the active matrix display being scanned in the conventional manner to write the display in a row-by-row fashion. Finally, the present display may also be of the stylus-driven type with (typically) a single electrode on the backplane and no permanent front electrode, writing of the display being effected by moving a stylus across the front surface of the display.

The edge seals and sealing techniques of the present invention are primarily described in connection with electrophoretic displays, but one of skill in the art will appreciate that these inventive edge seals and sealing techniques are highly-applicable to other electro-optic display technologies. Thus, for example, the present invention may be used to produce edge seals for use with liquid crystal displays and organic light emitting diode ("OLED") displays used in electronic book readers, portable computers, tablet computers, cellular telephones, smart cards, signs, watches, electronic shelf labels and flash drives.

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

The invention claimed is:

1. An electro-optic display comprising:

a backplane comprising at least one electrode;

a layer of an electro-optic material disposed adjacent to the backplane;

a light-transmissive electrically-conductive layer disposed on the opposite side of the layer of electro-optic material from the backplane;

a rod member disposed laterally adjacent to the backplane, the layer of an electro-optic material, and the light-transmissive electrically-conductive layer;

a first barrier layer disposed adjacent to the light-transmissive electrically-conductive layer and a first side of the rod member;

a second barrier layer disposed on the backplane and a second side of the rod member, the second side being the opposite side of the rod member from the first side; and a flexible barrier tape extending from an edge portion of the first barrier layer, around and in contact with the rod member, to an edge portion of the second barrier layer;

wherein the rod member is placed between overhanging portions of the first barrier layer and the second barrier layer that extend beyond a periphery of the light-transmissive electrically-conductive layer and the backplane.

2. The electro-optic display of claim 1 further comprising an edge sealing material within the flexible barrier tape, the edge sealing material being disposed:

at a first end of the rod member adjacent to a first corner of the electro-optic display, and at a second end of the rod member adjacent to a second corner of the electro-optic display.

3. The electro-optic display of claim 2 wherein the edge sealing material is a UV-curable resin.

4. The electro-optic display of claim 2 wherein the edge sealing material has a water vapor transmission rate between 2-3 $g/m^2/day$ at 60° C. and 90% relative humidity.

5. The electro-optic display of claim 1 wherein the barrier tape further comprises an adhesive layer on a surface of the barrier tape that contacts the edge portion of the first barrier layer, the rod member, and the edge portion of the second barrier layer.

6. The electro-optic display of claim 1 wherein the rod member is cylindrical and has an average diameter of between about 0.254 mm and about 2.54 mm.

7. The electro-optic display of claim 5 wherein the rod member is integrated into the barrier tape.

8. The electro-optic display of claim 7 wherein the rod member is positioned substantially along a lengthwise center portion of the barrier tape.

9. The electro-optic display of claim 1 wherein the barrier tape further comprises a layer of electrically insulating material disposed on a surface of the barrier tape that contacts the edge portion of the first barrier layer, the rod member, and the edge portion of the second barrier layer.

10. The electro-optic display of claim 1 wherein the barrier tape further comprises a metal foil layer disposed on a surface of the barrier tape opposite the surface that contacts the edge portion of the first barrier layer, the rod member, and the edge portion of the second barrier layer.

11. The electro-optic display of claim 1 wherein the barrier tape comprises a layer of adhesive material disposed on a first half of a lengthwise surface of the barrier tape and a layer of metal foil disposed on a second half of the lengthwise surface of the barrier tape.

12. The electro-optic display of claim 1 wherein the barrier tape comprises a colorant.

13. The electro-optic display of claim 1 wherein the first barrier layer and the second barrier layer extend beyond a periphery of the light-transmissive electrically-conductive layer and the backplane by an amount equal to a diameter of the rod member.

14. The electro-optic display of claim 1 wherein the rod member is positioned adjacent to the outer perimeter of electro-optic display to contact the flexible barrier tape at a bend point of the flexible barrier tape.

15. The electro-optic display of claim 1 wherein the flexible barrier has a bend radius that is controlled based on an average diameter and position of the rod member.

16. The electro-optic display of claim 1 wherein an average diameter of the rod member controls a bend radius of the flexible barrier tape to be greater than a minimum bend radius.

17. The electro-optic display of claim 1 wherein an average diameter of the rod member is set according to a thickness of the electro-optic display and a desired bend radius of the flexible barrier tape.

18. The electro-optic display of claim 1 wherein the flexible barrier tape is configured to hold the rod member in place.

19. An electro-optic display comprising:

a backplane comprising at least one electrode;

a layer of an electro-optic material disposed adjacent to the backplane;

a light-transmissive electrically-conductive layer disposed on the opposite side of the layer of electro-optic material from the backplane;

a rod member disposed laterally adjacent to the backplane, the layer of an electro-optic material, and the light-transmissive electrically-conductive layer;

a first barrier layer disposed adjacent to the light-transmissive electrically-conductive layer and a first side of the rod member;

a second barrier layer disposed on the backplane and a second side of the rod member, the second side being the opposite side of the rod member from the first side; and a flexible barrier tape extending from an edge portion of the first barrier layer, around and in contact with the rod member, to an edge portion of the second barrier layer;

wherein the first barrier layer and the second barrier layer extend beyond a periphery of the light-transmissive electrically-conductive layer and the backplane by an amount equal to a diameter of the rod member.

* * * * *